US008285676B2

(12) United States Patent
Bahl et al.

(10) Patent No.: US 8,285,676 B2
(45) Date of Patent: Oct. 9, 2012

(54) CONTAINMENT AGNOSTIC, N-ARY ROOTS LEVERAGED MODEL SYNCHRONIZATION

(75) Inventors: Rohit Bahl, Kanata (CA); Alan Yeung, Kanata (CA)

(73) Assignee: International Business Machines Corporation, Armonk, NY (US)

(*) Notice: Subject to any disclaimer, the term of this patent is extended or adjusted under 35 U.S.C. 154(b) by 239 days.

(21) Appl. No.: 12/727,391

(22) Filed: Mar. 19, 2010

(65) Prior Publication Data

US 2011/0231365 A1    Sep. 22, 2011

(30) Foreign Application Priority Data

Mar. 5, 2010 (CA) .................................. 2693454

(51) Int. Cl.
*G06F 17/00* (2006.01)
(52) U.S. Cl. ...................................... 707/626; 707/756
(58) Field of Classification Search ................ 707/626; 727/756
See application file for complete search history.

(56) References Cited

U.S. PATENT DOCUMENTS

| 2003/0145020 A1* | 7/2003 | Ngo et al. ................... 707/201 |
| 2006/0248128 A1 | 11/2006 | Acharya et al. |
| 2009/0019426 A1 | 1/2009 | Baeumer et al. |
| 2009/0193063 A1 | 7/2009 | Leroux et al. |

* cited by examiner

*Primary Examiner* — Rehana Perveen
*Assistant Examiner* — Alexander Khong
(74) *Attorney, Agent, or Firm* — Cantor Colburn LLP; Daniel McLoughlin

(57) ABSTRACT

A technique for annotating and synchronizing on a device is provided. A client root model of fragments is marked with annotations in response to triggers received by an application of the device. Marking the client root model of the fragments with annotations includes at least: in response to the any of the fragments being extracted out and flagged, marking the client root model with annotations; in response to binding any of the fragments to a source, marking the client root model of the fragments with annotations and marking the client root model as flagged; and in response to sharing in any the of fragments, marking the client root model with annotations.

24 Claims, 20 Drawing Sheets

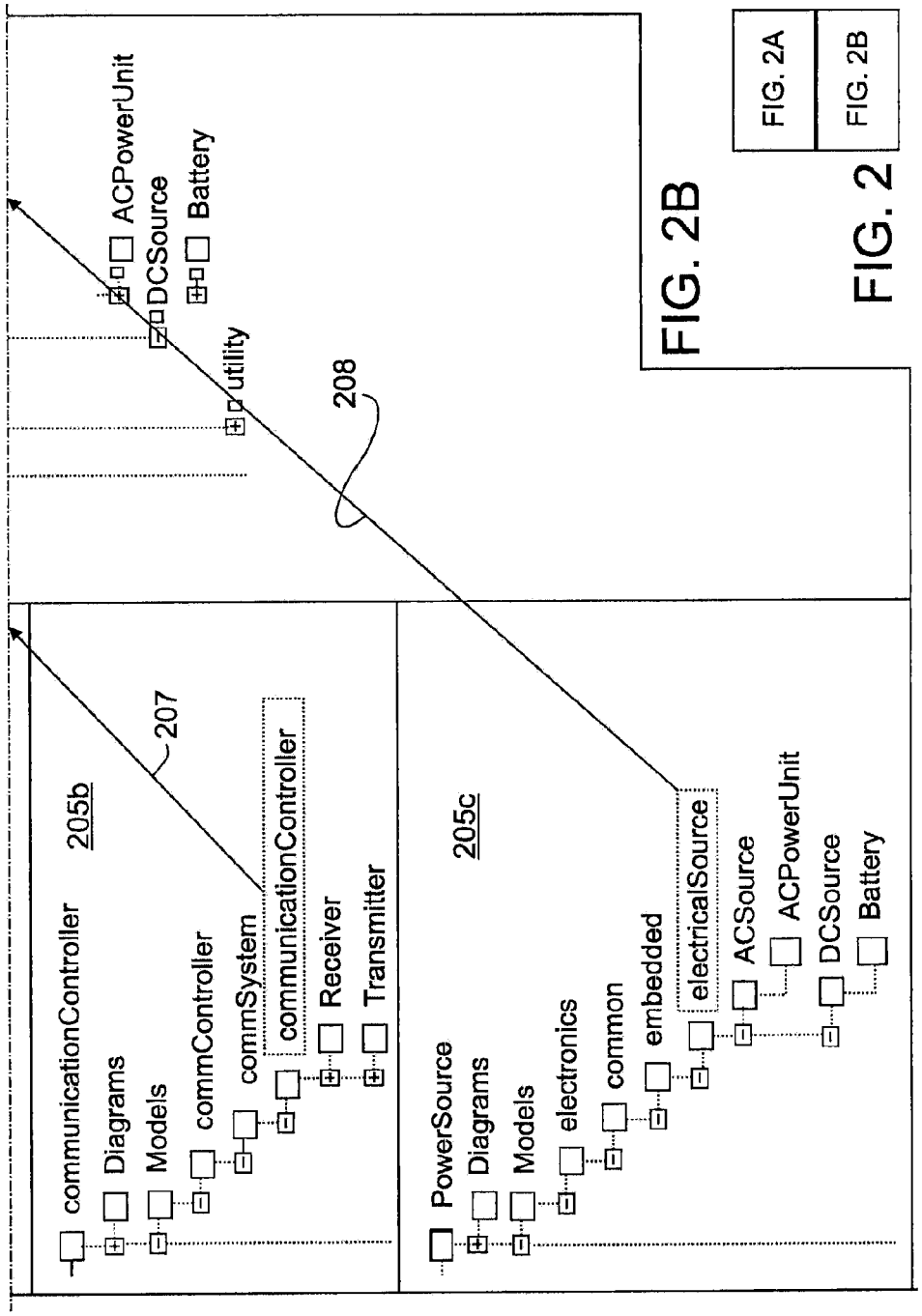

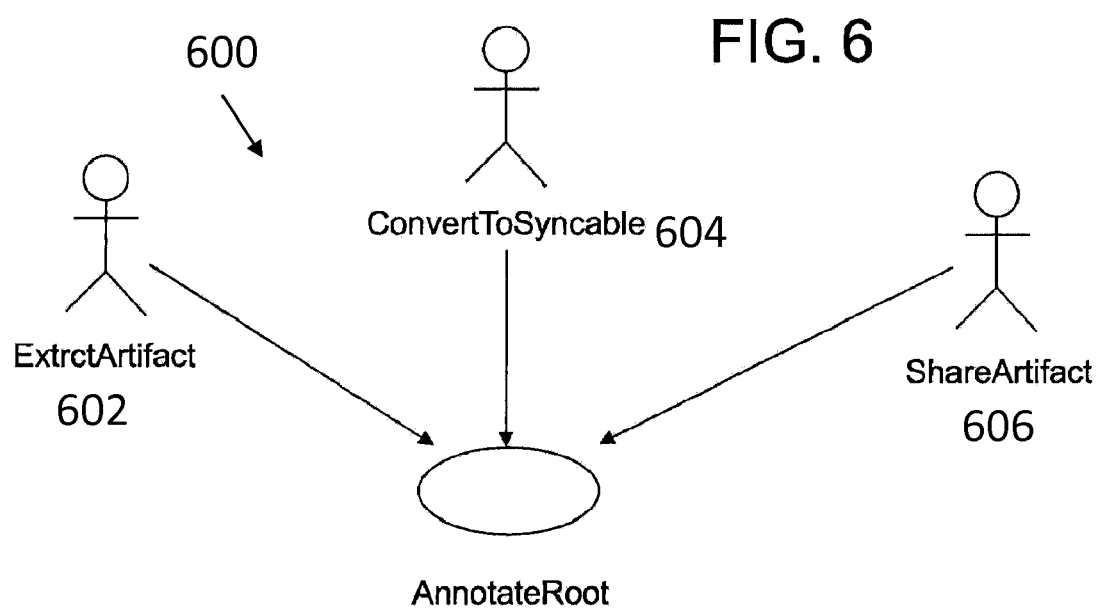

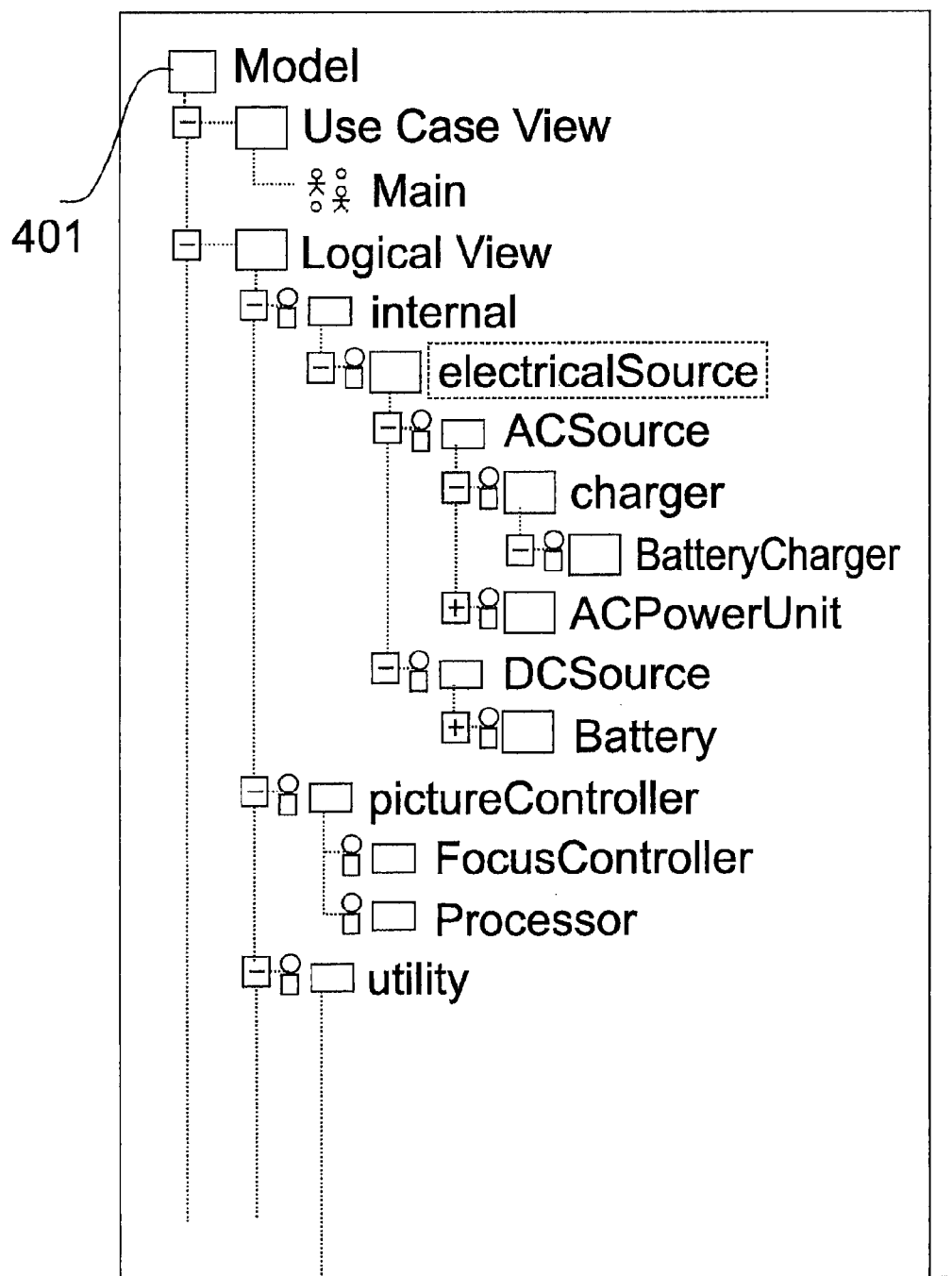

| FIG. 5A | FIG. 5B |

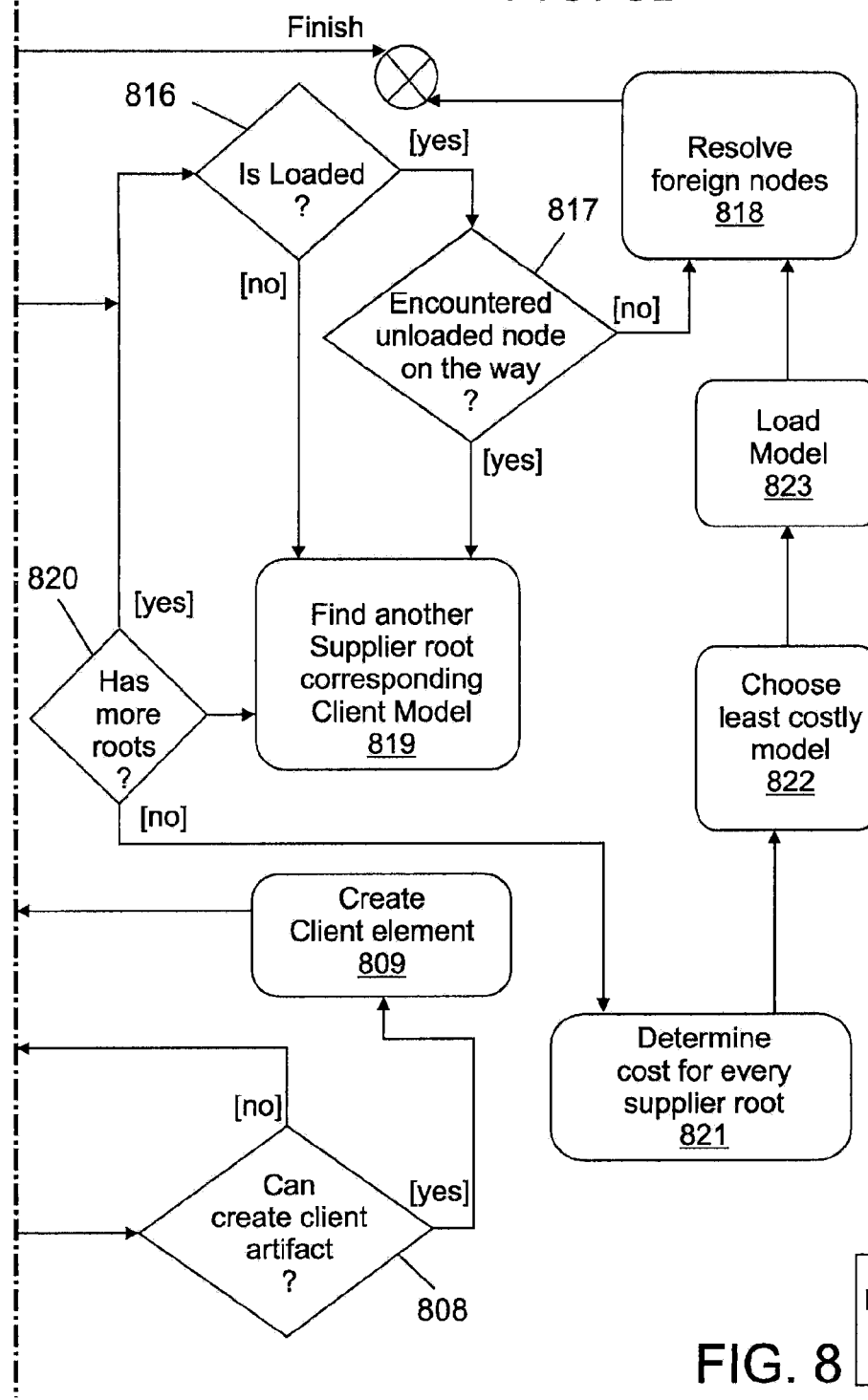

CONTAINMENT AGNOSTIC, N-ARY ROOTS LEVERAGED MODEL SYNCHRONIZATION

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. and this application claims the benefit under 35 U.S.C. §119 to Canadian Patent Application CA 2693454 filed Mar. 5, 2010.

BACKGROUND

The present invention relates to synchronizing elements, and more specifically, to annotating and synchronizing models.

Data modeling is the act of exploring data-oriented structures. Like other modeling artifacts data models can be used for a variety of purposes, from high-level conceptual models to physical data models. When copies of a data model may be made, and the copy is called a client and the original is called a supplier (or source). At different times, the client (or a part of the client) needs to be synchronized (recopied from) to the supplier, e.g., because of changes that have been made in the supplier. However, sometimes changes have been to the client and the hierarchy of the client does match the supplier and/or parts of the client have been refactored out (that is, part of the client has been extracted out of the client).

BRIEF SUMMARY

According to one embodiment of the present invention, a method for annotating and synchronizing on a device is provided. A client root model of a plurality of fragments is marked with annotations in response to triggers received by an application of the device. Marking the client root model of the plurality of fragments with annotations includes at least: in response to the any of the plurality of fragments being extracted out and flagged, marking the client root model with annotations; in response to binding any of the plurality fragments to a source, marking the client root model of the plurality of fragments with annotations and marking the client root model as flagged; and in response to sharing in any of the plurality of fragments, marking the client root model with annotations.

Further, in response to a request to synchronize the plurality of fragments being shared by a sharing client model, annotations are found in the client root model of the plurality of fragments referring to a supplier model. 1-J of the plurality of fragments are synchronized, where J is a last of the plurality of fragments being synchronized. Synchronizing occurs for each of the plurality of fragments and synchronizing for each of the plurality of fragments include: scanning the supplier model to match a supplier file to a processing fragment of the plurality of fragments, and when the supplier file (supplier resource) is matched in the supplier model, the scanning stops; for the supplier file, creating an ancestor containment hierarchy, and the ancestor containment hierarchy starts with the supplier file and ends at a supplier primary root of the supplier model; creating a copy of the supplier file in a temporary framework reflecting the supplier model; and if it determined that there is reference to a foreign element in the supplier file, resolving the foreign element when synchronizing at least one of a previous processing fragment and subsequent processing fragment, where a containment hierarchy of the foreign element is added in the temporary framework.

Additional features are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

FIG. 6 illustrates a client model annotation diagram that illustrates triggers for annotating client models in accordance with exemplary embodiments.

DETAILED DESCRIPTION

Figure 1:
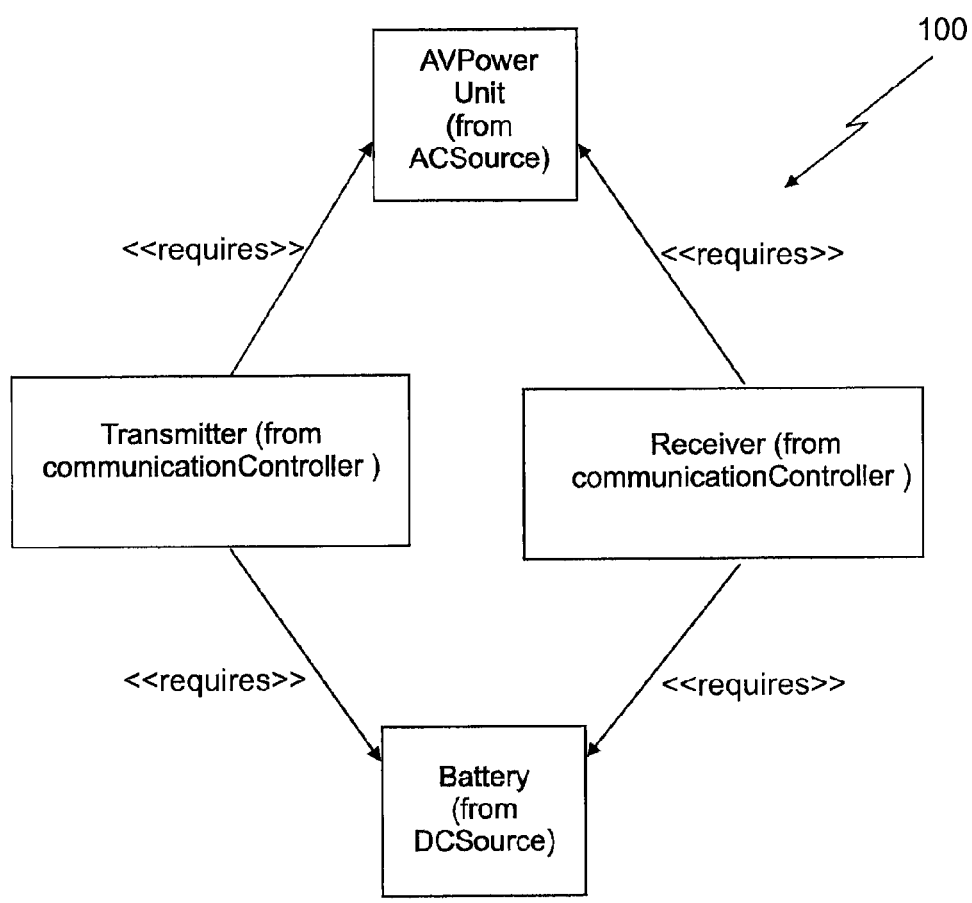
FIG. 1 illustrates an example of a cell phone class diagram.

One issue related to modeling is modeling synchronizing of client modeling artifacts that have undergone significant refactoring, affecting their containment hierarchy, causing their fully qualified names to become drastically different than those in their corresponding synchronization sources (i.e., supplier), which in turn renders any client model relative references inferred relative to the refactored modeling artifact incomprehensible.

Typically enterprise models comprise inter-related fragmented modeling artifacts referred to as client artifacts that may require synchronization with a baseline supplier artifact. The motivation of synchronization of models could be numerous, ranging from model conversion (i.e., importing supplier artifacts into client artifacts), to compare merge (i.e., involving selective updating of client artifacts based on supplier artifacts), to supporting multi-environment parallel development (i.e., developing legacy supplier artifacts in parallel with newer client artifacts), etc. Commonly, the modeling elements being bound together by a relationship (such as associations, generalizations, etc) are referenced using their fully qualified names comprising containment hierarchy segments up until the simple name of the end artifact.

As understood by one skilled in the art, a fully qualified name is an unambiguous name that specifies which object, function, or variable a call refers to absolutely. The fully qualified name gives an element's exact location without ambiguity. In some computer programming languages and as used herein, the fully qualified name will use two colons (::).

In cases where the client artifacts have not been refactored, both the client artifact and the supplier artifact share the same model relative containment hierarchy that is also used to define references to participating modeling elements and comprises of fully qualified names built from segments starting at the model root. Consequently, when a client artifact is synchronized, the corresponding supplier artifact is processed and the client artifact is recreated. Processing of the supplier artifact could involve references to other supplier artifacts that are not participating in synchronization. In those cases the corresponding client artifact involved (driving the synchronization) is used as a starting point to follow the model relative containment hierarchy dictated by the supplier artifact, to arrive at the referenced client artifact. In contrasting scenarios where the client artifact has undergone refactoring causing a change in its containment hierarchy, the client artifact is no longer consistent with the hierarchy used for references by the supplier artifact. Thus, the referenced artifact defined in terms of the supplier containment hierarchy becomes incomprehensible relative to the new containment hierarchy of the client artifact. As a result, the synchronization fails because the client artifact and the supplier artifact are following two different containment hierarchies.

An artifact in the Unified Modeling Language (UML) is the specification of a physical piece of information that is used or produced by a software development process, or by deployment and operation of a system. Examples of artifacts include but are not limited to model files, source files, scripts, and binary executable files, a table in a database system, a development deliverable, word-processing document, a mail message, etc. Also, in UML, artifacts are the physical entities that are deployed on nodes, devices, and execution environments. Other UML elements such as classes and components are first manifested into artifacts and instances of these artifacts are then deployed. Artifacts can also be composed of other artifacts.

Additionally, refactoring is a change in the model. For example, database refactoring may be a small change to the database schema which improves the database model design without changing its semantics. The process of database refactoring is the evolutionary improvement of the database schema (model) so as to improve the ability to support the new needs of customers, to support evolutionary software development, and to fix existing legacy database design problems.

Another challenge that arises is in cases where the containment hierarchy of the supplier artifact and the client artifact remain the same, but the modeling artifact referenced via the supplier artifact, during synchronization of the client artifact, has undergone containment refactoring in the client world. So in essence, one may still use the client model as a starting point for resolution of the referenced artifact, but the element being described by the supplier artifact reference definition (value) has been refactored to a new containment hierarchy in the client world. That is, the client artifact in the client model has been extracted out (as shown in blocks 205b and 205c of FIG. 2, in blocks 413 of FIG. 4, and block 900 of FIG. 9).

Hence two issues are mentioned above, which are addressed by exemplary embodiments: 1. Synchronized Client Artifact Containment hierarchy modification (SCACH): Involves changes to the containment hierarchy of the client artifact that is being synchronized. 2. Referent Client Artifact Containment hierarchy modification (RCACH): Involves changes in the containment hierarchy of the client artifact referenced by the client artifact that is actually undergoing synchronization. 3. Unloaded Client Model: A third issue arises where the models serving as starting points in the client world are unloaded in memory and consequently unavailable.

As a consequence of the above challenges, so as to ensure synchronizing of client artifacts, conventional techniques are compelled to stave off refactoring that would alter containment hierarchies (defined using qualified names) of these client artifacts and in turn render their referenced client artifact incomprehensible by the synchronization process. This issue is further exacerbated when translating from a single model domain to a tool characterized by a multi model domain, such as Eclipse technology. In such a multi-model domain, for the sake of preserving containment references for synchronization, one risks loosing the opportunity to refactor a shareable modeling client artifact into an independent resource that could eventually have been elegantly shared amongst the various dependent models.

However, exemplary embodiments leverage off an efficient technique that is non-invasive with respect to the supplier artifacts. Exemplary embodiments allow refactoring of primary client artifacts (that undergo synchronization) as well as referent client artifacts, which includes modifying the containment hierarchy while still accommodating synchronization. In other words, exemplary embodiments facilitate greater refactoring flexibility of client artifacts including modifying their containment hierarchies as a result of extractions.

FIG. 1 illustrates an example of a cell phone class diagram 100, which is a model of a cell phone. Using the example of a modeled cell phone 100, the cell phone model 100 is utilized to illustrate the synchronization issue. The cell phone model 100 highlights the architecture for the synchronization issue and illustrates the dependency to "Battery" and a dependency to "ACPowerUnit" from the "Transmitter" and the "Receiver". The "Transmitter" is the primary client artifact being synchronized and its referent client artifacts are "ACPowerUnit" and "Battery".

Figure 2A:
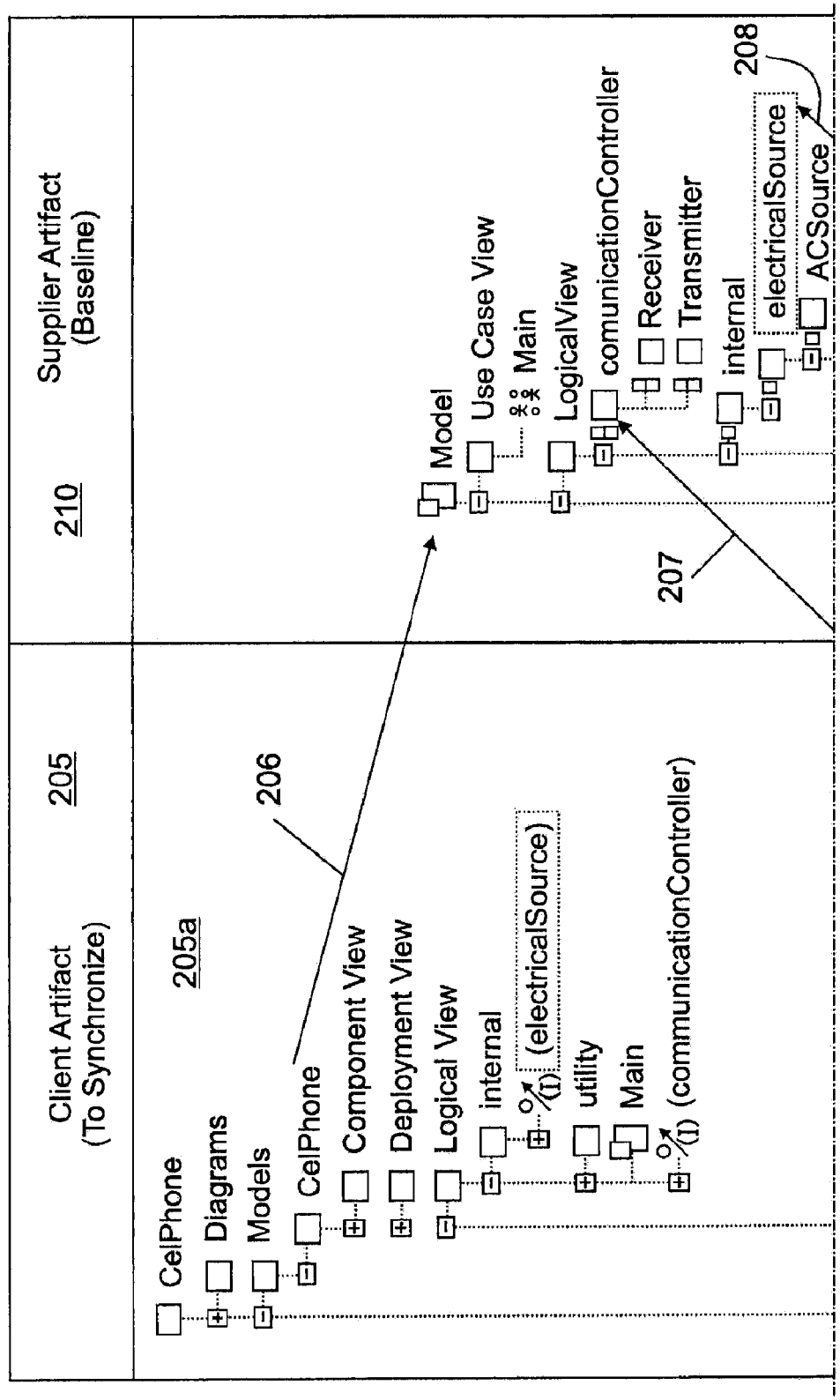
FIG. 2 illustrates of client artifacts and supplier artifacts.

FIG. 2 illustrates a model 200 which is depicted as a table. The table of the model 200 depicts distinction between artifacts, namely client artifacts 205 which can be synchronized with respect to baseline supplier artifacts 210. The supplier artifacts 210 were the source for creating the client artifacts 205. In other words, the client artifacts 205 were originally copied (created) from the supplier artifacts 210 and at time t=0 the client artifacts 205 would be a mirrored reflection (based on the syntax of the modeling software, such as Eclipse, that the client artifact 205 were copied into). At some point after time t=0, the client artifacts 205 have been refactored into the example shown in FIG. 2.

The arrows 206, 207, and 208 serve as mental cues assisting in positional information between the client and supplier artifacts 205 and 210 in the two separate categories. For example, the arrow 206 shows that "CellPhone" in project 205a corresponds to "Model" in supplier artifact 210. In other words, the "Model" in the supplier artifact 210 is the CellPhone "Model". The arrow 207 shows that "communicationController" in project 205b corresponds to "communicationController" in supplier artifact 210. The arrow 208 shows that "electricalSource" in project 205c corresponds to "electricalSource" in the supplier artifact 210.

The following are a few characteristics of the example:

1. Refactoring of client artifact (SCACH modification): As one would notice "communicationController" has undergone refactoring by its extraction from the "CellPhone" project 205a to now be housed into the separate project 205b. The separate project 205b may be referred to as "communicationController" project 205b. The slanted arrow in the "CellPhone" project 205a is a representation that the "communicationController" has been refactored or extracted out of the "CellPhone" project 205a, and now in the "CellPhone" project 205a "communicationController" is a leaf that connects (bridges to an independent model, which is the independent model "commController" in the project 205b). SCACH is an abbreviation for Synchronized Client Artifact Containment Hierarchy. The refactored "communicationController" qualifies as SCACH modification since "communicationController" is the artifact actively undergoing synchronization.

2. Refactoring of client artifact (RCACH modification): As one would notice (by the slanted arrow) "electricalSource" has undergone refactoring by its extraction from the "CellPhone" model 205a to now be housed into the separate project 205c. This demonstrates RCACH modification, and the separate project 205b may be referred to as "electricalSource" project 205c. The "electricalSource" left in the "CellPhone" project 205a is a leaf that bridges to the "electronics" model in the "electricalSource" project 205c. RCACH is an abbreviation for Referent Client Artifact Containment Hierarchy. The refactored "electricalSource" qualifies as RCACH modification since it is referenced from "communicationController" that is undergoing synchronization.

3. Rename containment: The client artifact, i.e., "electricalSource" has been housed in a new containment with the top model (is synonymous with root model, top most level, and/or the root) being named "electronics". In the client artifacts 205 particularly in "electricalSource" project 205c, renaming of the top level containers of "ACPowerUnit" from "CellPhone::Logical View::internal" to "Electronics::common::embedded" has resulted in the fully qualified name of "ACPowerUnit" being different in the client artifact 205 as compared to the supplier artifacts 210. While the supplier artifact 210 continues to keep the qualified name of "ACPowerUnit" to "CellPhone::Logical View::internal::electricalSource::ACSource::ACPowerUnit", the client artifact 205 now has the new qualified name of "Electronics::common::electricalSource::ACSource::ACPowerUnit". Similar treatment is meted out to "Transmitter" as well whose qualified name is changed from "CellPhone::LogicalView::communicationController::Transmitter" to "commController::commSystem::communicationController::Transmitter". Note that "Model" in the supplier artifact 210 is the same as the term "CellPhone".

4. No Coupling of Supplier artifacts: Supplier artifacts are not tied to client artifacts and therefore do not have any knowledge of their corresponding client artifacts. In other words, exemplary embodiments do no require the application 360 (discussed herein) to annotate the root model (which is "Model" of the supplier artifact 210 to keep track of (changes such as refactoring in) client artifacts 205.

5. Dependency definition: As the "CellPhone" class diagram 100 depicts, there is a dependency from the "Receiver" and "Transmitter" to the "ACPowerUnit" and the "Battery". This dependency information is within the client model and can be discovered by traversing (parsing) the client model as understood by one skilled in the art. Consequently, in the supplier artifacts the dependency element from the "Transmitter" to the "ACPowerUnit" has the fully qualified name for "ACPowerUnit" as "CellPhone::LogicalView::internal::electricalSource::ACSource::ACPowerUnit".

In the above context, synchronizing challenges occur when one attempts to synchronize the "communicationController" in the client artifact 205 to the supplier artifact 210. Particularly the issue arises because synchronizing the "communicationController" implies synchronizing its contents the "Transmitter". Synchronizing of the "Transmitter" entails resolving its dependency to "CellPhone::LogicalView::internal::electricalSource::ACSource::ACPowerUnit." Since "CellPhone::Logical View::internal::electricalSource::ACSource::ACPowerUnit" in the supplier domain (which is in supplier artifact 210) has no knowledge about where "ACPowerUnit" is present in the client domain (which is in client artifact 205), the synchronization fails. This issue is further compounded by the fact that "CellPhone::LogicalView::internal::electricalSource::ACSource::ACPowerUnit" (which was the original qualified name in project 205a at time t=0, which would be the same as its qualified name in the supplier artifact 210) has been refactored in the client domain (client artifact 205) to now exist at "Electronics::common::electricalSource::ACSource::ACPowerUnit" in the project 205b.

To conclude as is evident there are the two problems that are illustrated above:

1. Since the client artifact "communicationController" has been refactored out of its original container hierarchy (of project 205a), the supplier artifact's mention of the reference "CellPhone::LogicalView::internal::electricalSource::ACSource::ACPowerUnit" is moot, since the following client artifact that is being synchronized is (in this case) "communicationController". One is unable to find the relative location of "ACPowerUnit". Primarily because "communicationController" is apparently itself in a new containment hierarchy (which is the containment hierarchy of project 205b) inconsistent with the containment hierarchy (which is the original containment hierarchy at time t=0) used by the supplier.

2. Even if one were magically able to have the first issue resolved of having the same containment hierarchy, there is the secondary issue as well where the referent client artifact has also been refactored and has an inconsistent containment hierarchy. In other words, one would not be able to reach the "ACPowerUnit", since "ACPowerUnit" no longer belongs to the "Cellphone" model in the project 205a but instead is contained in 205c.

In order to avoid supporting such containment modifying complexity some conventional modeling tools might just shy away and prevent containment modifying refactoring for the sake of synchronization process simplicity. To support such synchronizations, one might attempt bidirectional bindings. Bidirectional bindings involve maintaining a binding between the supplier artifacts and the corresponding client artifacts. In other words, this invasive technique would amount to the supplier artifacts also maintaining a reference to their corresponding client artifacts. That is, the supplier artifact would be annotated with a reference to the supplier artifact's corresponding client artifacts. For the scenario provided above, when one synchronizes the client artifact "communicationController", because of the binding from the supplier to client, the synchronizer will be able to trace the new position of "CellPhone::LogicalView::internal::electricalSource::ACSource::ACPowerUnit" to the corresponding "Electronics::common::electricalSource::ACSource::ACPowerUnit" instead. However, the following are tradeoffs for the bidirectional bindings approach: a) it is an invasive approach, since it implies modifying the source artifacts to keep a mapping of all clients' artifacts. b) Not scalable: Multiple users might refactor clients differently; consequently the mapping list kept by each supplier artifact could be enormous. c) Read only supplier artifacts: Client synchronizing against a baseline might not have the privilege to embed mapping information related to refactoring in the supplier artifacts.

Another modeling tool approach may be refactoring logs based inference. Refactoring logs based inference maintains logs of refactoring that can be traced and provide a mapping between the original element names and their corresponding current re-factored names. However, the following are tradeoffs of the refactoring logs based inference approach. a) Not Scalable: Large models with numerous elements would require some extractions to accordingly produce refactoring logs with mapping for millions of constituent elements, which will be quite resource intensive. b) Maintainability headache: Requires an additional level of knowledge managing these additional refactor logs. c) Inefficient: would require large amount of memory to manage hash maps for looking up such mappings.

Exemplary embodiments provide a technique and implementation which together serve as an innovative and optimized approach in achieving synchronizing of modeling artifacts characterized by client artifacts that have undergone severe refactoring of their containment hierarchies. Exemplary embodiments include normalizing (matching) modified containment hierarchies and connecting leaf nodes to other independent containment roots to extend containment hierarchies in order to facilitate reference resolution that is required during synchronization. Furthermore, exemplary embodiments employ an approach of leveraging of a customized N-ary root traversal mechanism to achieve synchronization involving resolution of references that would ordinarily be unreachable because of the client model (containing the referent) being unloaded and therefore non-traversable. Further, exemplary embodiments include the ability of a synchronizer to derive and subsequently recommend optimized solutions with regards to the model to load in cases where all of the n-roots are unloaded and therefore unreachable. To achieve this, exemplary embodiment, apply the strategy of the directed weighted graph and with a single traversal calculate the least costly model to be loaded, thus being able to proactively load a client model that serves as an optimized solution for the purpose of synchronization The technique of exemplary embodiments may be referred to as a Containment Agnostic Synchronizer (CA-Sync) which is implemented by application 360 (discussed herein). The containment Agnostic Synchronizer (CA-Sync) of application 360 may be defined mathematically in predicate calculus as the following:

$$\forall y \exists x [R(x,y) \wedge \exists z [T(x,z) \wedge \exists m [S(z,m) \rightarrow R(m,y)]]]$$

Where $\forall$ and $\exists$ are universal and existential quantifiers; y $\in$ referenced modeling artifacts; x $\in$ referencing modeling artifacts contained in synchronized fragment; z $\in$ synchronized modeling fragments and z subsets x; m $\in$ set of models; R(x,y): x cross references y; T(x,z): z owns x; and S(z,m): m shares z.

Exemplary embodiments further construct a directed acyclic weighted graph to assist with model synchronization: A directed acyclic graph G(Z, Aw, g). Z=a set of nodes corresponding to modeling artifact containers. Aw=weighted arcs directed towards children thus implying the container hierarchy. W={f(n,t): n is the number of constituent elements in the container, t is the type of elements}. g=a function mapping the containment hierarchy, associating an arc with an ordered pair (x,y) of nodes where x is the initial point representing the container modeling artifact and y is the terminal point representing the nested modeling artifact.

Figure 3:
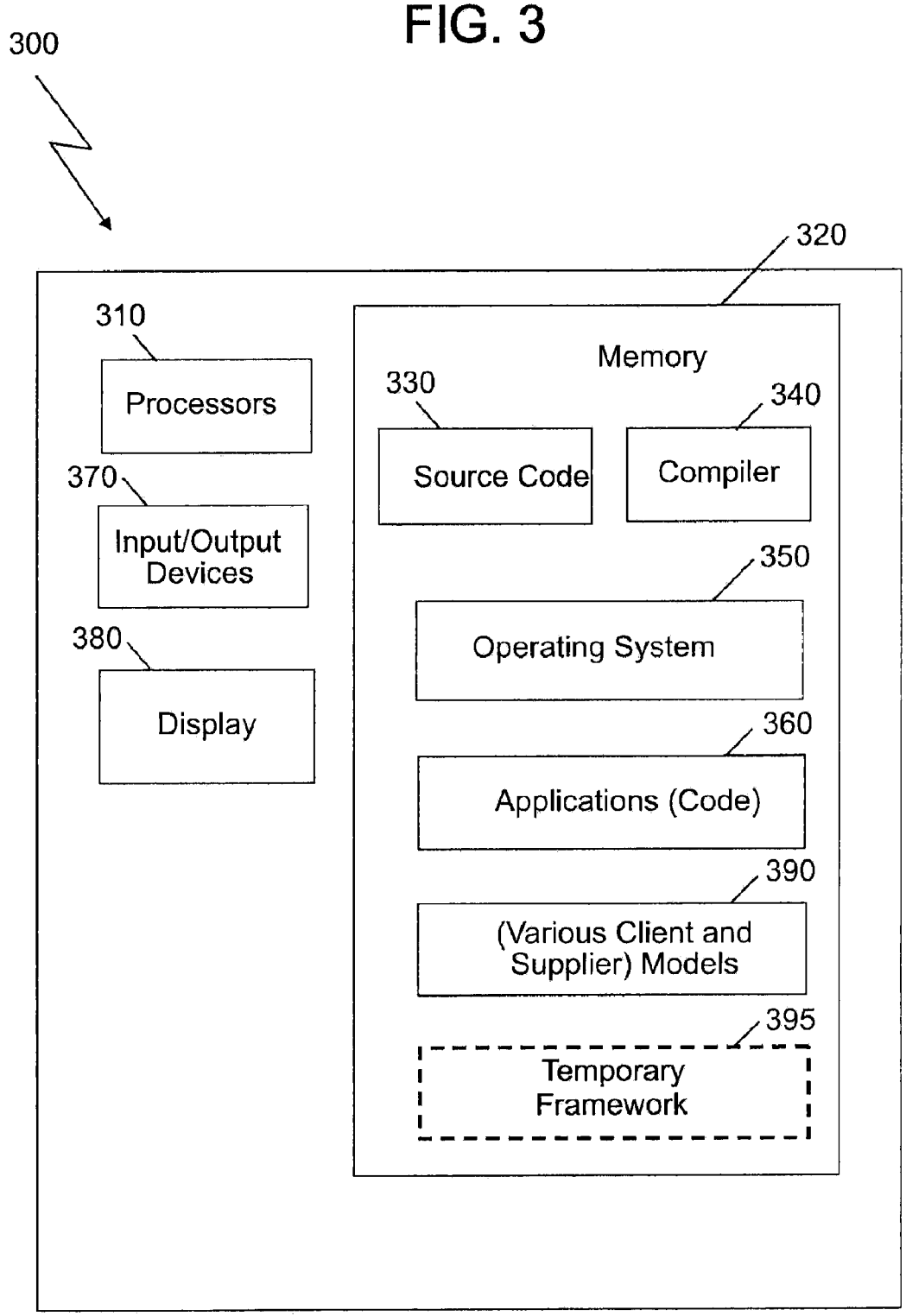
FIG. 3 is an example of a computer configured to implement exemplary embodiments.
Figure 4B:
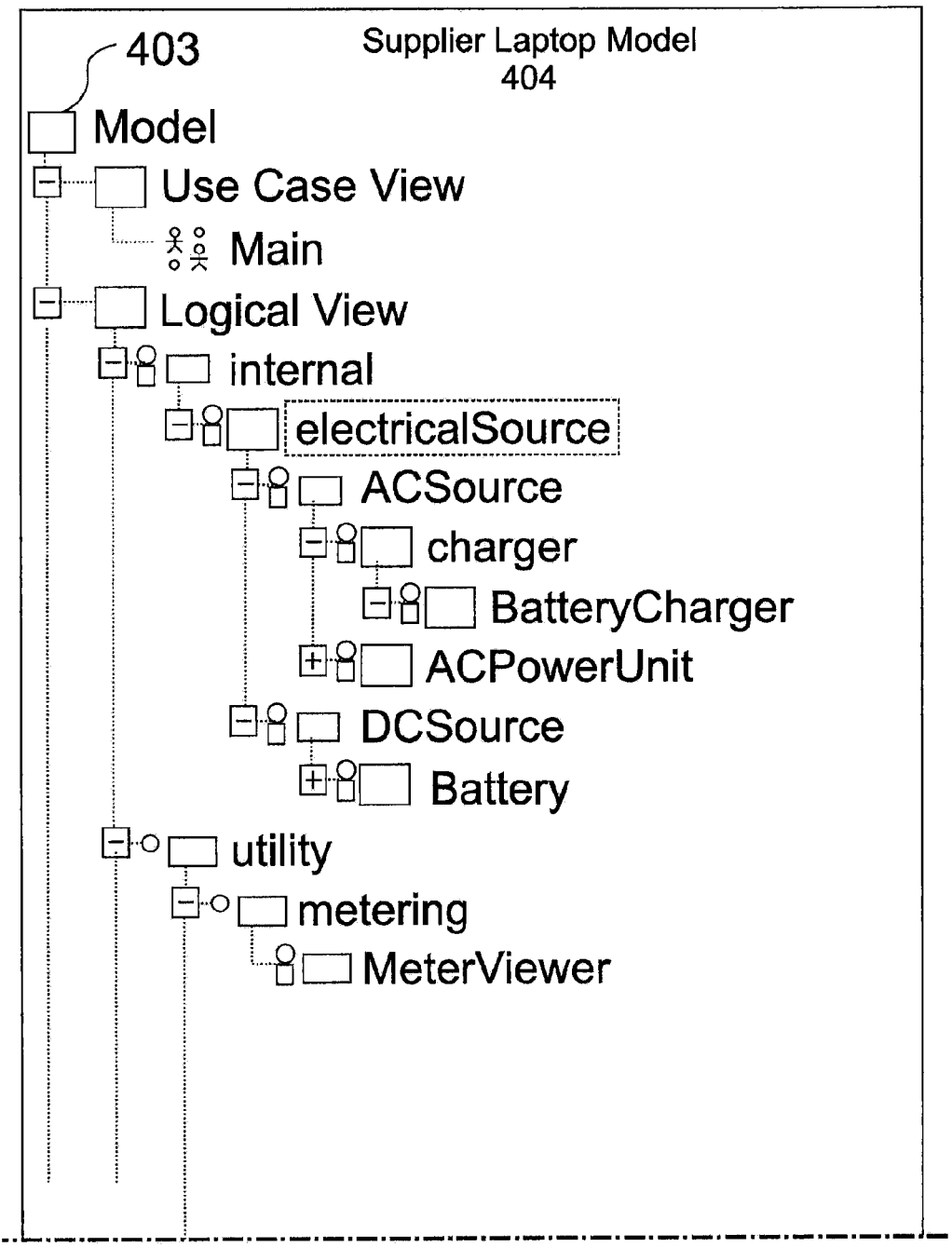
FIG. 4 illustrates examples of client models and supplier models in accordance with exemplary embodiments.
Figure 4C:
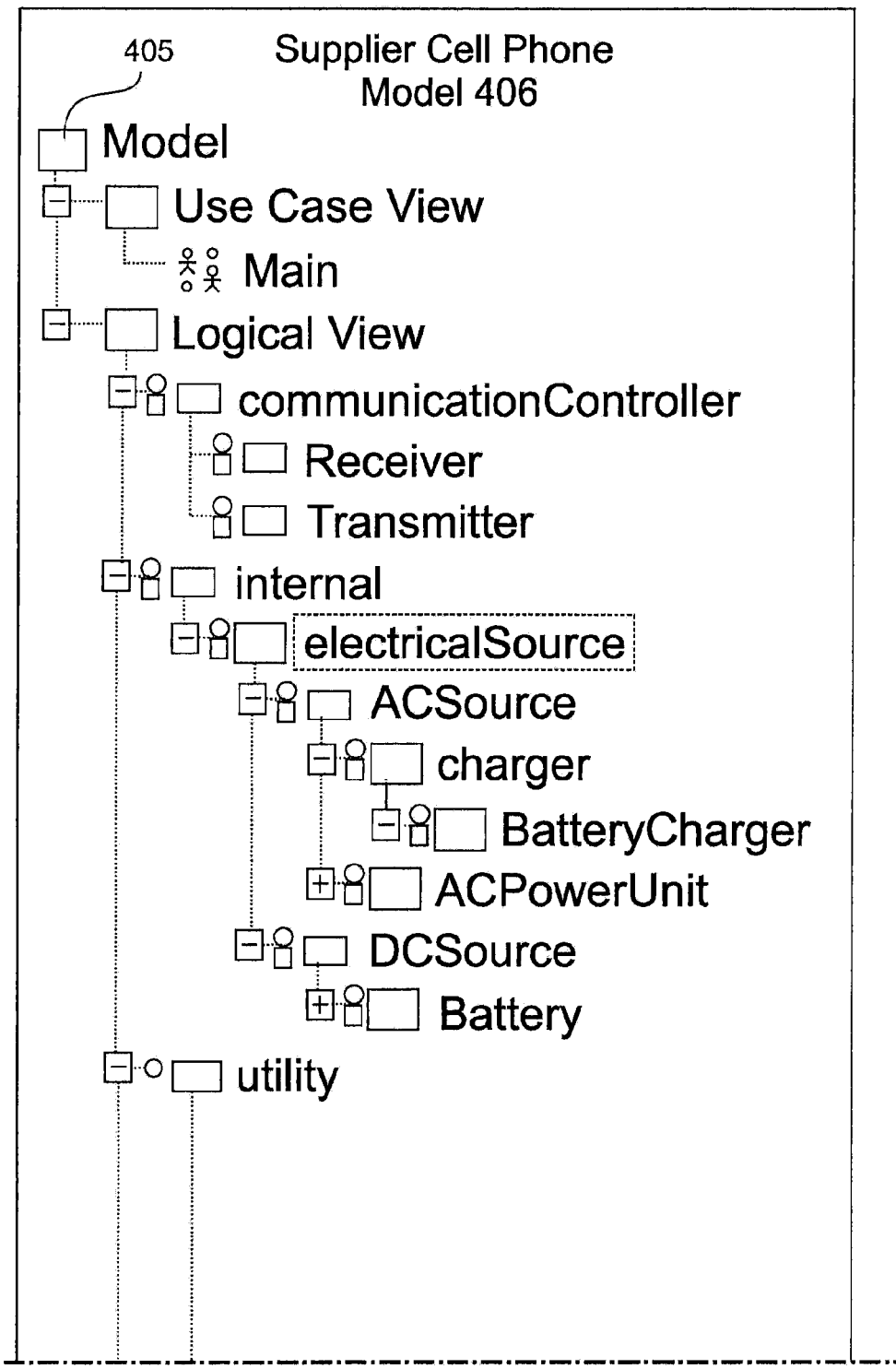
Figure 4D:
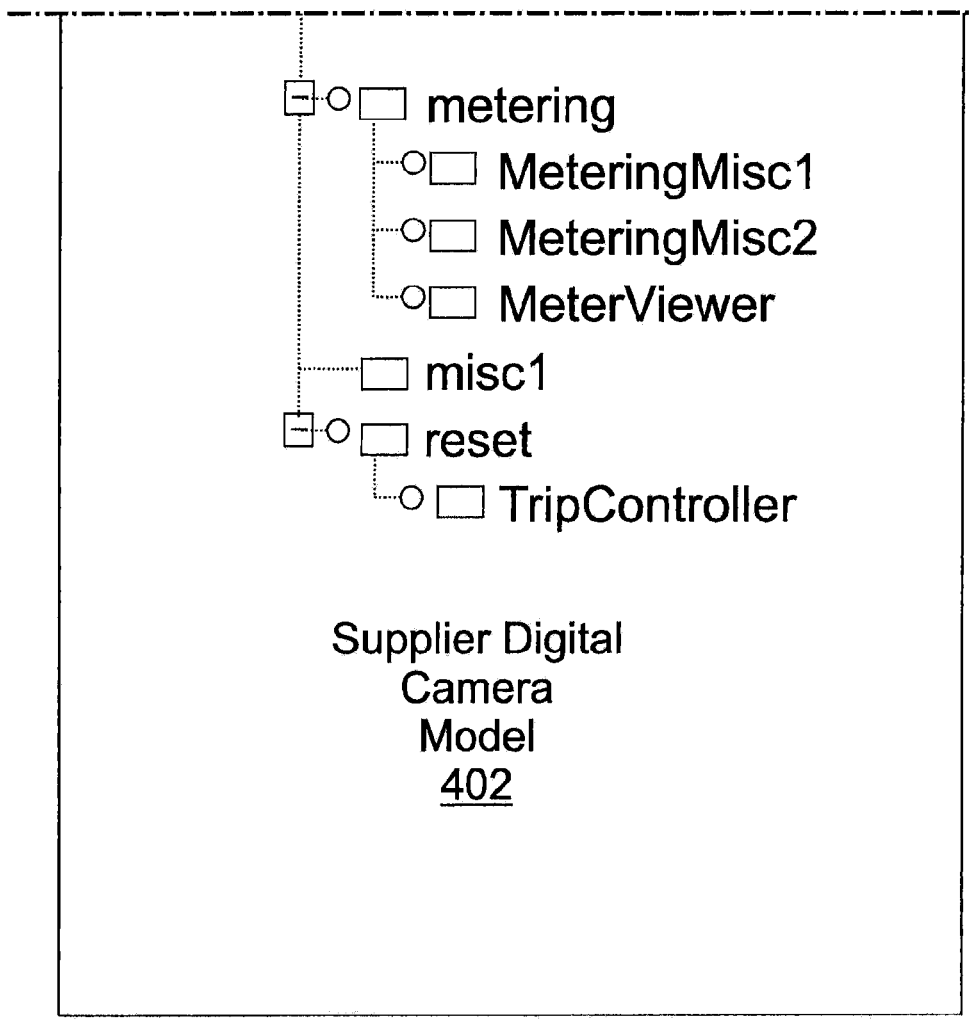
Figure 4E:
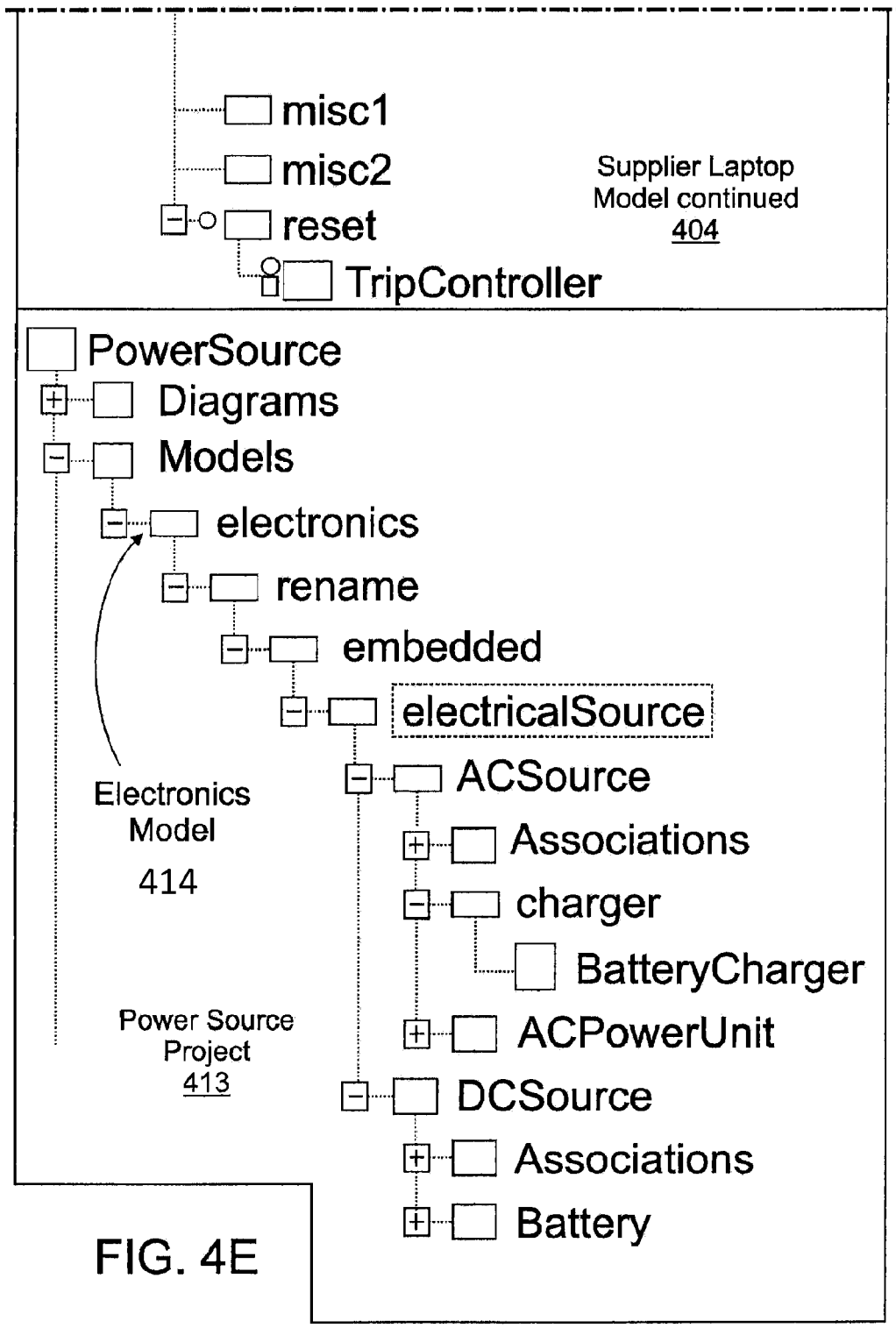
Figure 4F:
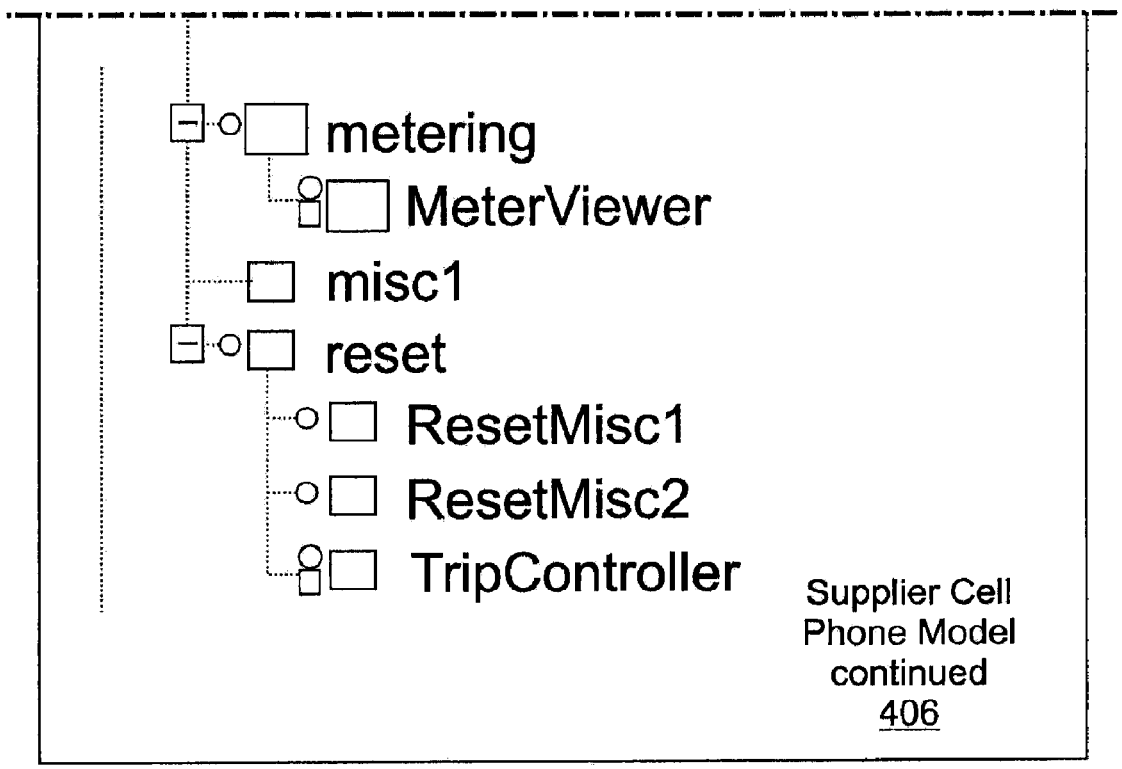
Figure 4G:
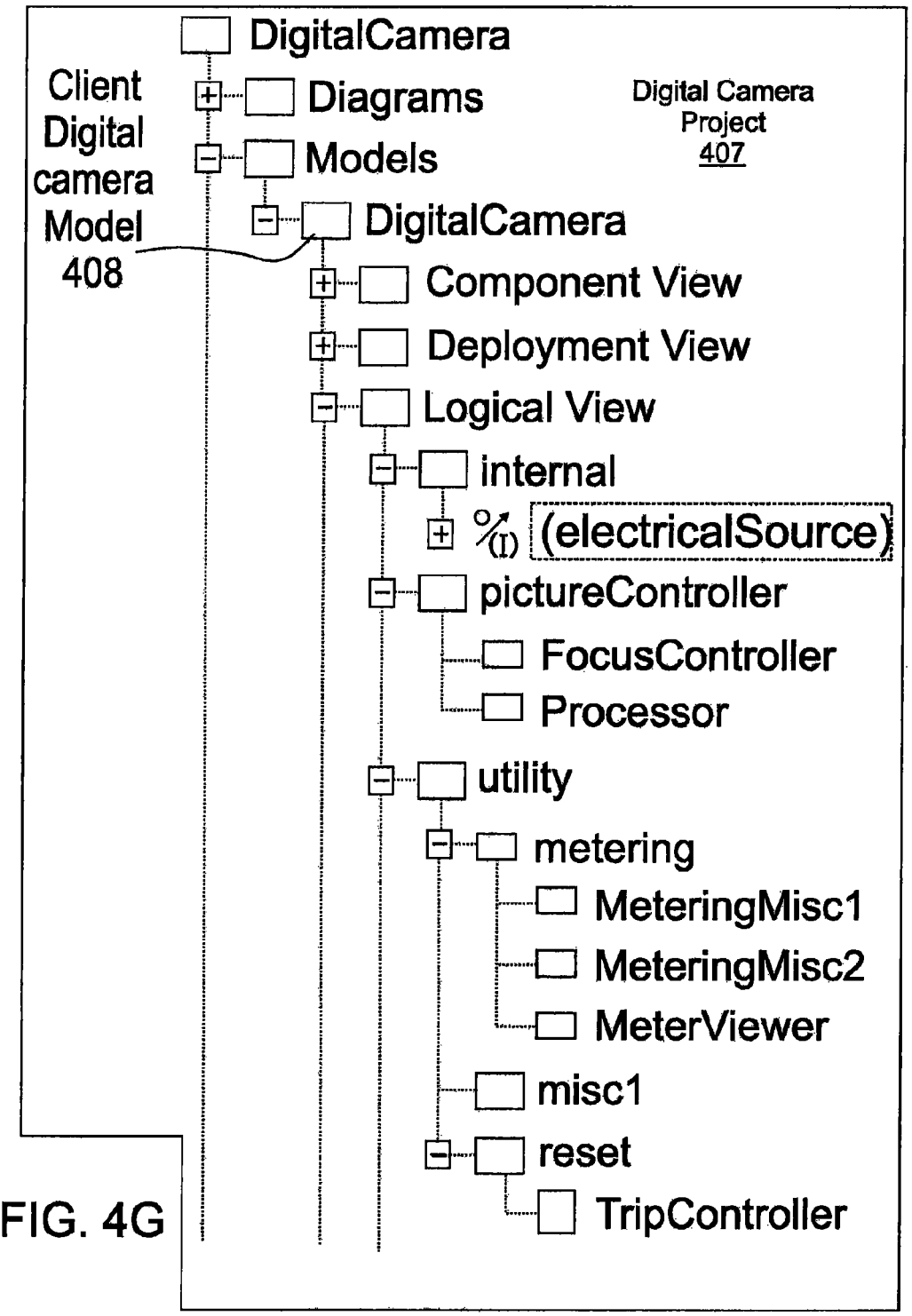
Figure 4H:
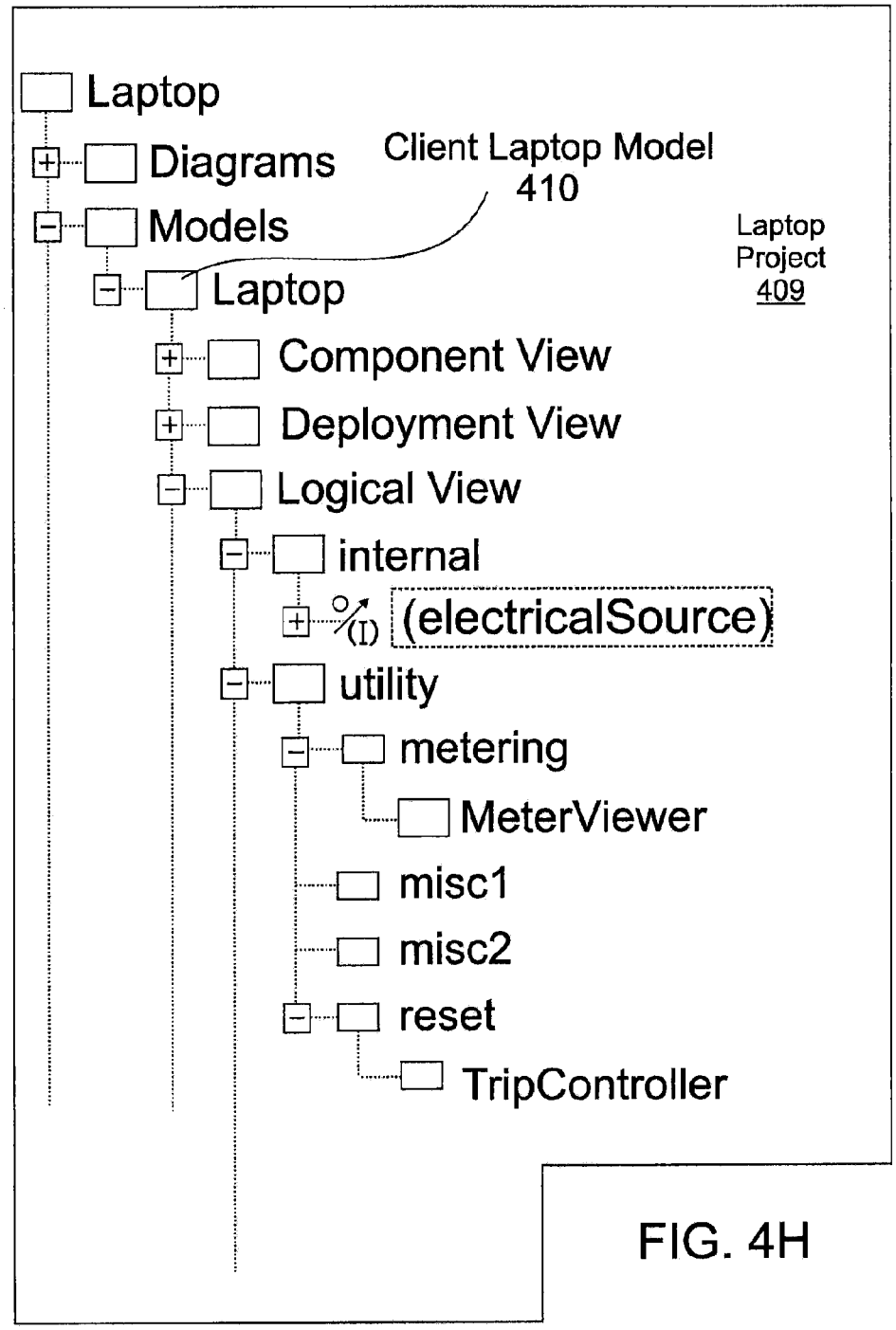
Figure 4I:
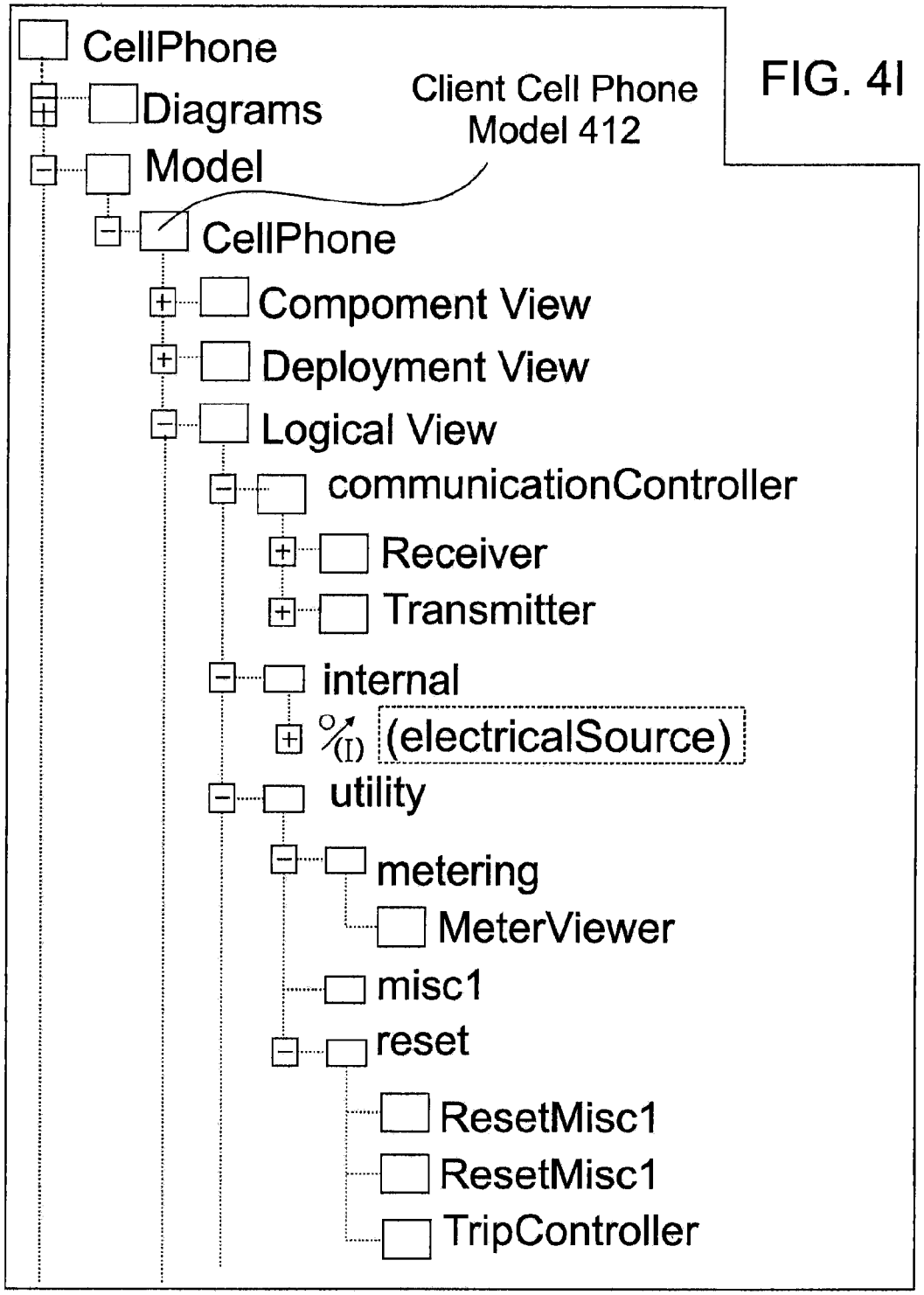

FIG. 3 is an example of a computer 300 configured to implement exemplary embodiments. Various methods, models, procedures, modules, processes, operations, flow diagrams, and techniques discussed herein including the containment agnostic synchronizer (CA-Sync) may be incorporated in and/or utilize the capabilities of the computer 300. Moreover, capabilities of the computer 300 may be utilized to implement features exemplary embodiments discussed herein or shown in the figures.

Generally, in terms of hardware architecture, the computer 300 may include one or more processors 310, computer readable storage memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components. The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The computer readable memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the computer readable memory 320 may include one or more separate programs, each of which comprises an ordered listing of executable instructions for implementing logical functions. The software in the memory 320 includes a suitable operating system (O/S) 350, compiler 340, source code 330, and one or more applications 160 of the exemplary embodiments. As illustrated, the application 360 comprises numerous functional components for implementing the features, processes, methods, functions, and operations of the exemplary embodiments. The application 360 of the computer 300 may represent numerous applications, agents, software components, modules, interfaces, controllers, etc., as discussed herein but the application 360 is not meant to be a limitation.

The operating system 350 may control the execution of other computer programs, and provides scheduling, input-output control, file and data management, memory management, and communication control and related services. The application(s) 360 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction. Further, the application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions.

The I/O devices 370 may include input devices (or peripherals) such as, for example but not limited to, a mouse, keyboard, scanner, microphone, camera, etc. Furthermore, the I/O devices 370 may also include output devices (or peripherals), for example but not limited to, a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or an intranet. The I/O devices 370 may be connected to and/or communicate with the processor 310 utilizing Bluetooth connections and cables (via, e.g., Universal Serial Bus (USB) ports, serial ports, parallel ports, FireWire, HDMI (High-Definition Multimedia Interface), etc.).

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

For the sake of brevity, all of the models both supplier models (supplier artifacts) and client models (supplier artifacts) discussed herein are represented as model software 390. The amount of model applications 390 may be numerous and one skilled in the art understands that all models, including projects, packages, artifacts, roots, graphs, etc., are represented by model software applications 390.

When the application 360 is implemented in software it should be noted that the application 360 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 360 can be embodied in any computer-readable medium 320 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 320 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory. In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 300 includes non-limiting examples of software and hardware components that may be included in various devices, servers, and systems discussed herein, and it is understood that additional software and hardware components may be included in the various devices and systems discussed in exemplary embodiments.

FIG. 4 illustrates examples of client models and supplier models in accordance with exemplary embodiments. FIG. 4 illustrates the application 360 utilizing techniques to address challenges when synchronizing the client models to the supplier models as discussed herein. Any item of the supplier models and client models may generally be referred to as an artifact as understood by one skilled in the art. FIG. 4 depicts the following supplier models (collectively referred to as supplier models) supplier "DigitalCamera" model 402, supplier "Laptop" model 404, and supplier "CellPhone" model 406.

Also, FIG. 4 depicts the following client models (collectively referred to as client models) client "DigitalCamera" model 408, client "Laptop" model 410, and client "CellPhone" model 412, and client "electronics" model 414. Client "DigitalCamera" model 408 is in "DigitalCamera" project 407, and "DigitalCamera" model 408 may be referred to as the client root model, root model, primary root, top level element, top element, etc, because of its position. Client "Laptop" model 410 is in "Laptop" project 409, and the client "Laptop" model 410 may be referred to as the client root model, root model, primary root, top level element, top element, etc, because of its position in the container. Client "CellPhone" model 412 is in "CellPhone" project 411, and the client "CellPhone" model 412 may be referred to as the client root model, root model, primary root, top level element, top element, etc, because of its position in the container. Client "electronics" model 414 is in "PowerSource" project 413, and likewise, client "electronics" model 414 may be referred to as the client root model, root model, primary root, top level element, top element, etc, because of its position in the container.

As an example task, the application 360 is configured to synchronize the client artifacts, e.g., "ACSource" and "DCSource" in the project "PowerSource" 413 to the supplier model "CellPhone" 406 which contains the "ACSource" and "DCSource" model 406.

Characteristics of the Models:

1. All of the supplier models, i.e., supplier "CellPhone" model 406, supplier "Laptop" model 404, and supplier "DigitalCamera" model 402 contain the "electricalSource" package (artifact).

2. In the supplier artifact (e.g., supplier "CellPhone" model 406, supplier "Laptop" model 404, and supplier "Digital-Camera" model 402), "Battery" has a relation (which is noted in the supplier model) to "BatteryCharger" with the reference (to "BatteryCharger") being represented via a model qualified reference, i.e.,"LogicalView::internal::electricalSource::ACSource::charger::BatteryCharger".

3. In the supplier model (e.g., supplier "CellPhone" model 406, supplier "Laptop" model 404, and supplier "Digital-Camera" model 402), "ACPowerUnit" has a relation to "MeterViewer" via a qualified reference as "LogicalView::utility::metering::MeterViewer".

4. In the supplier model (e.g., supplier "CellPhone" model 406, supplier "Laptop" model 404, and supplier "Digital-Camera" model 402), "Battery" has a relation to "TripController" via a qualified reference as "LogicalView::internal::utility::reset::TripController".

5. The client "CellPhone" model 412, client "Laptop" model 410, and client "DigitalCamera" model 408 all share the "electricalSource" package that is now housed within an altogether different project, i.e., the "PowerSource" project 413, thus modifying the "PowerSource" project 413 and all of its constituent's containment hierarchy. Another side effect for each of these client models (e.g., client "CellPhone" model 412, client "Laptop" model 410, and client "Digital-Camera" model 408) is that "LogicalView::internal" is now a leaf since its contained "electricalSource" has been refactored (shown in the "PowerSource" project 413).

The application 360 is configured to address such issues below during synchronization of the client model to the supplier model, and the issues encountered may include but are not limited to:

1. SCACH modification: The containment hierarchy of the client artifact being synchronized (e.g., "DCSource") is inconsistent with the containment hierarchy used by the supplier artifact. Consequently, during synchronizing "DCSource", one (the application 360) leans about "LogicalView::internal::electricalSource::ACSource::charger::BatteryCharger" in the supplier model, and needs to ensure that the element under consideration is the "BatteryCharger" whose indirect parent "ACPowerUnit" is also undergoing synchronization. The application 360 is configured to address this situation. For example, "DCSource" and "ACSource" are being synchronized, and "DCSource" has a "Battery" that cross-references a child of "ACSource" which is "BatteryCharger". The subject undergoing SCACH modification is "DCSource".

2. RCACH modification: While synchronizing to the supplier artifact "ACPowerUnit" one (the application 360) encounters a reference to "LogicalView::utility::metering::MeterViewer" in the supplier model. One could imagine refactoring out "MeterViewer" from a client model (such as client models 408, 410, or 412) into its own independent project thereby modifying "MeterViewer's" hierarchy and consequently its new qualified name would be "ModelUtilities::ElectricalUtilities::utility::metering::MeterViewer". This would demonstrate the referenced entity's containment hierarchy modification. Since the corresponding "MeterViewer" in the client world as suggested above could have undergone refactoring, one (the application 360) needs to be able to resolve "MeterViewer" in light of the refactoring of the reference in the client world (i.e., client models 408, 410, and 412), which in this case could be housed in the newly created project (not shown). The application 360 is configured to address this situation.

3. There is a further possibility, that the primary client artifact (which in this case is the client "CellPhone" model 412) is unloaded. However, the application 360 is configured to find alternate routes under such circumstances.

For explanation purposes but not limitation, activities of the application 360 (of the CA-Sync mechanics) that facilitate synchronization can be divided into the following two categories based on their temporal characteristics: The first category corresponds to: (1) refactoring induced latent annotation and (2) sharing induced latent annotation.

A synchronization aware service of the application 360 is performed prior to the actual synchronization and is configured to make the client artifact CA-Sync (application 360) consumable. The synchronization aware service by the application 360 runs as a daemon that gets triggered during refactoring and sharing actions occurring on the modeling artifacts (i.e., occurring on the client "DigitalCamera" model 408, client "Laptop" model 410, client "CellPhone" model 412, and the client "electronics" model 414).

1) For refactoring induced latent annotation, client models that are bound (e.g., a client model that has a supplier model as its source) to supplier models maintain a Uniform Resource Identifier (URI) to their corresponding supplier models via the application 360. The application 360 (CA-Sync) ensures that this information (e.g., the URI pointing back to the supplier model) is propagated to the synchronizable fragment (e.g., the application 360 annotates the client root model (top level element/node, primary root model, primary root) of the fragment and/or annotates the fragment itself when the fragment is the client root model as shown in box 905 of FIG. 9) being extracted out of its original containment to the new containment specified location. This URI constitutes the primary root of the supplier model (e.g., the primary root can be said to be the supplier "CellPhone" model 406, but in the supplier "CellPhone" model 406 the primary root is "Model" 405 although one skilled in the art would recognize "Model" 405 as being the same as the supplier "CellPhone" model 406). That is "Model" 405 is the top level element contained within the supplier resource 406 and one skilled in the art understand that supplier "CellPhone" model 406 contains the root element 405 and all of the root element's 405 constituents. In this example, the new containment location for "electricalSource" is the "electronics" model 414, which is in the "PowerSource" project 413. As such, since "electricalSource" is a fragment that has been extracted from client "CellPhone" model 412, the application 360 marks (annotates) in the client "electronics" model 414 the supplier primary root which is the URI that references (points) back to the supplier "CellPhone" model 406. If, e.g., "electricalSource" were its own client root model as shown in FIG. 9, the application 360 would mark (annotate) in "electricalSource" model 905 the supplier primary root (i.e., URI) that references (points) back to the supplier "CellPhone" model 406.

Figure 9:
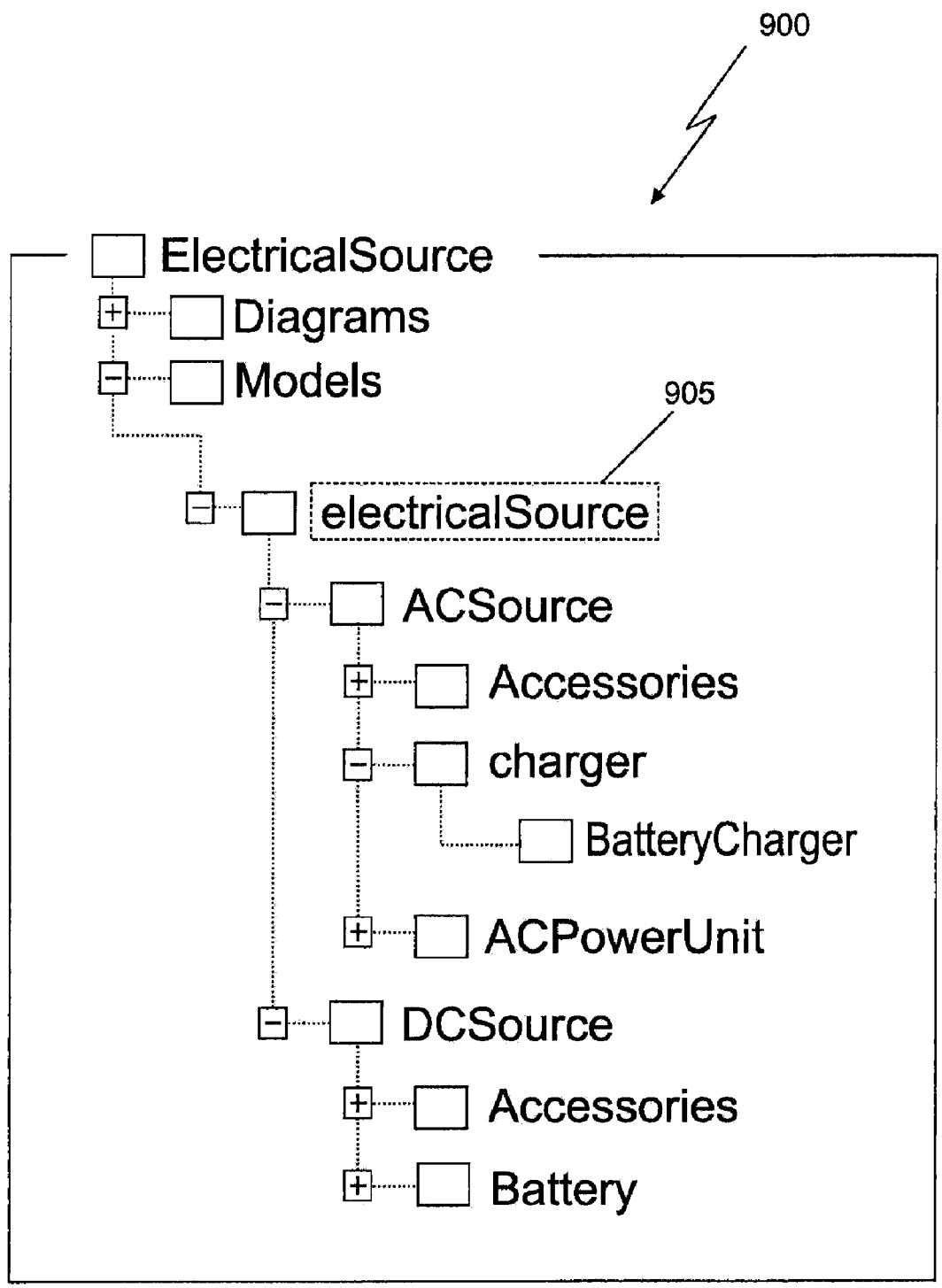
FIG. 9 illustrates a project in accordance with exemplary embodiments.

Also, for refactoring induced latent annotation, the application 360 is configured to mark client model extractions (i.e., mark the new client root model of the extracted fragment when the extracted fragment is nested and/or mark the extracted fragment itself when the extracted fragment is the client root model as shown in FIG. 9). That is, these client models that have undergone extraction are further marked with an annotation flagging them as client model extracted synchronizable fragments, by the application 360. The intent being to exclude such marked models from N-ary root finding activities. For example, since "electricalSource" is nested in client "electronics" model 414, the application 360 marks (annotates) in the "electronics" model 414 a flag to indicate that "electronics" model 414 now contains an extracted synchronizable fragment ("electricalSource"). If, e.g., "electricalSource" were its own client root model as shown in FIG. 9, the application 360 would mark (annotate) in "electricalSource" model 905 with a flag to indicate that "electricalSource" 905 is an extracted synchronizable fragment.

2) For sharing induced latent annotation, any newly created client models (such as client "DigitalCamera" model 408, and client "Laptop" model 410) may share an external pre-existing synchronizable artifact (such as "electricalSource") utilizing the application 360). By the application 360, the supplier artifact corresponding to this newly created sharing client artifact is annotated as an additional root to the client artifact being shared in. In terms of the example in FIG. 4 above, this means that the client artifact "electronics" model 414 in the "PowerSource" package 413 will initially be annotated by the application 360 with the supplier primary root (which is the supplier root URI) indicating where the client artifact "CellPhone" model 412 was copied (derived) from. At time t=0, the client "CellPhone" model 412 was a direct reflection (copy) of supplier "CellPhone" model 406, so supplier "CellPhone" model 406 is source or the supplier root for the client "CellPhone" model 412; at some time after t=0 the "electricalSource" was extracted out of the client "CellPhone" model 412. So, initially, the application 360 marks the URI in ("electronics" model 414) that refers back to supplier "CellPhone" model 406 to indicate how (i.e., the location) to synchronize with the supplier "CellPhone" model 406 that supplied the client "CellPhone" model 412. Since the synchronizable fragment is "electricalSource", the application 360 would annotate "electronics" model 414 with a path to the resource corresponding to the supplier "CellPhone" model 406. Since "electricalSource" was extracted out of "CellPhone" model 412, this initial URI marked in "electronics" model 414 is called the supplier primary root. When each additional (newly added) client model such as "DigitalCamera" model 408 and "Laptop" model 410 share in the (preexisting) "electricalSource" in the "electronics" model 414 of the "PowerSource" package 413, the "DigitalCamera" model 408 and "Laptop" model 410 too would have their corresponding supplier root URIs added as secondary roots to the client modeling artifact (which in this case is "electronics" model 414) by the application 360. So, the application 360 marks in the "electronics" model 414 the URI (referencing) to the supplier "DigitalCamera" model 402 (i.e., marks the supplier root "Model" 401 for client "DigitalCamera" model 408) and the application 360 marks in the "electronic" model 414 the URI (referencing) to the supplier "Laptop" model 410 (i.e., marks the supplier root "Model" 403). By the annotations of the application 360, it can be realized that the N-ary roots (which are "DigitalCamera" model 408, "Laptop" model 410, and "CellPhone" model 412) are associated with a synchronizable fragment (i.e., the "electricalSource" fragment in the "electronics" model 414).

Figures 5, 5A:
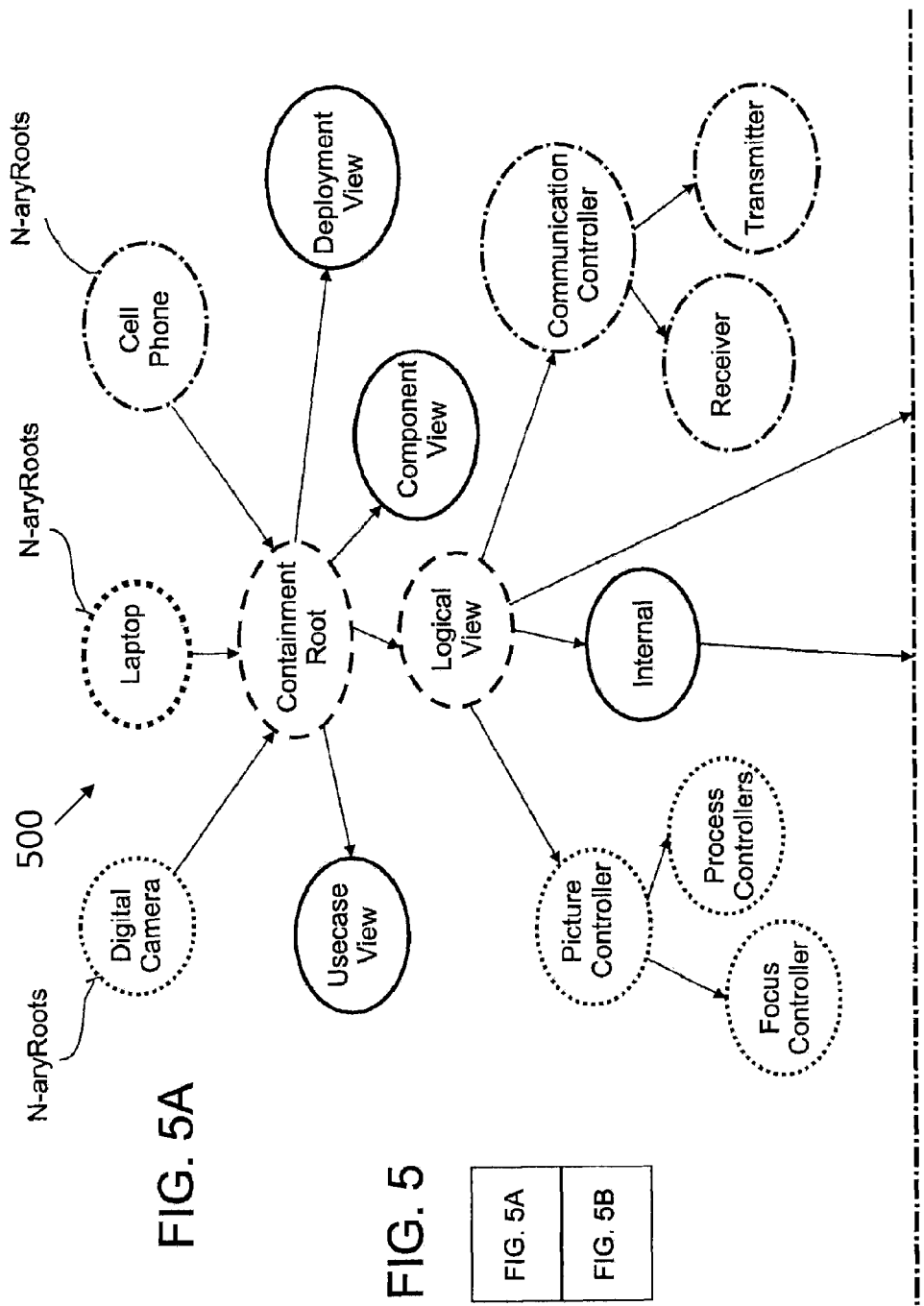
FIG. 5 illustrates a directed graph in accordance with exemplary embodiments.
Figure 5B:
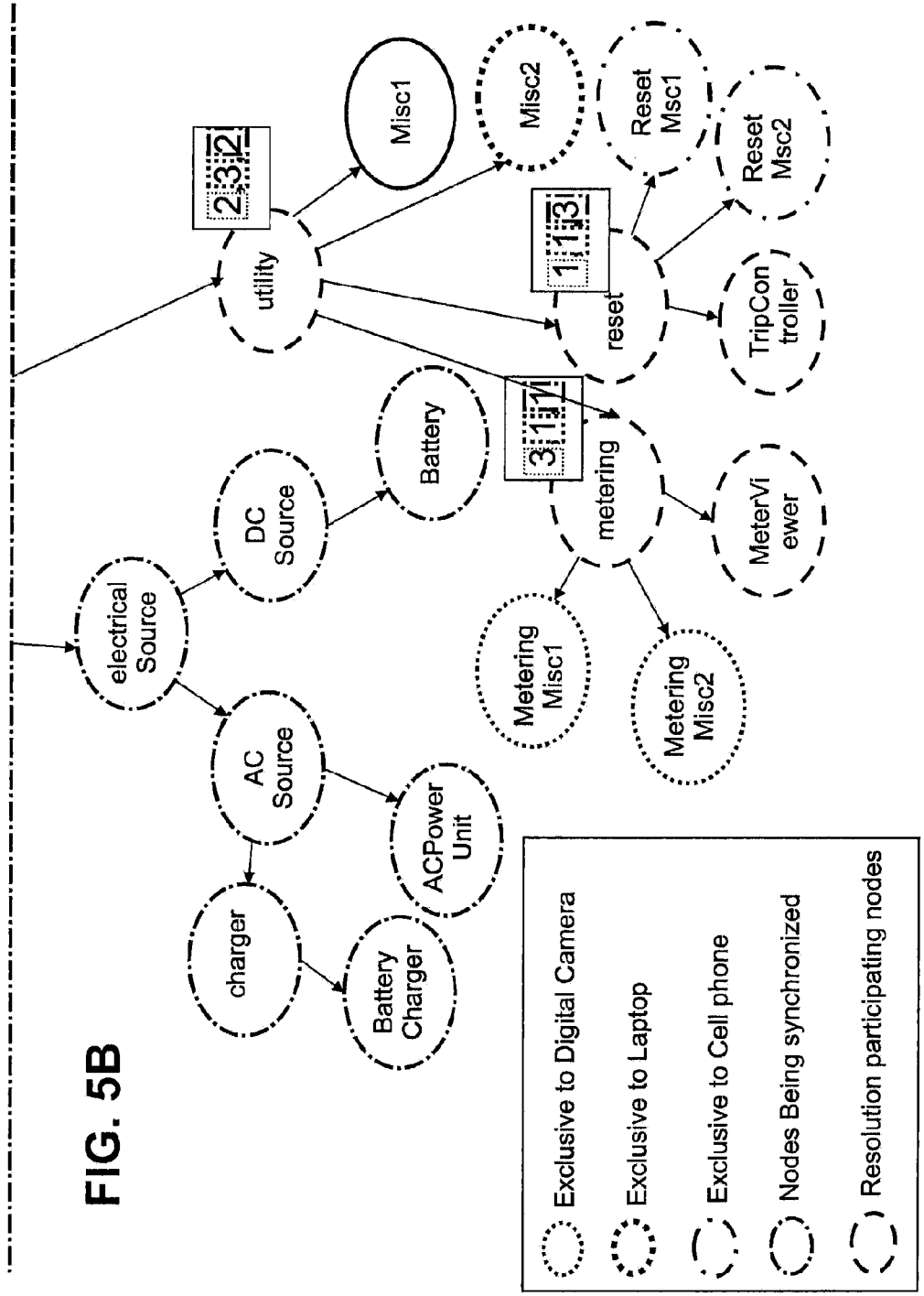

FIG. 5 illustrates a directed graph 500 (or digraph) in accordance with exemplary embodiments. The directed graph 500 represents the nodes of the client models (client "DigitalCamera" model 408, client "Laptop" model 410, client "CellPhone" model 412, and includes extracted "electricalSource" in the client "electronics" model 414) on top of each other, and the directed graph 500 does not show duplicative nodes (nodes) that are contained in each of client models. The digraph 500 (which can be traversed by the application 360 to resolve foreign elements) is created in the temporary framework 395.

FIG. 5 depicts an abridged version of CA-Sync main activities (by the application 360) in accordance with exemplary embodiments. During synchronization by the application 360, FIG. 5 refers to operations in FIG. 8. For example, during synchronization, the application 360 is configured to (create the digraph 500 in the temporary framework 395 and/or) traverse the client models (client "DigitalCamera" model 408, client "Laptop" model 410, client "CellPhone" model 412, and "electricalSource" in the client "electronics" model 414. Note every node for the clients 408, 410, and 412 are illustrated for explanation purposes, but every node would not be necessary for the operations in FIG. 8.

As understood by one skilled in the art, the ovals (elements) in the directed graph 500 are referred to as vertices, nodes, or objects, and the lines with arrows connecting one oval to another are referred to as arcs, directed edges, or arrows.

1. In exemplary embodiments, the supplier URI serving as the supplier primary root is extracted by the application 360 from the client artifact that is undergoing synchronization (see operation 802).

2. This URI is used to process (i.e., utilized to synchronize) the root model (electronics model 414), and the application 360 utilizes the URI in the root model to recreate the corresponding client artifact being synchronized (see operation 803). For example, the application 360 extracts from the "electronic" model 414 the annotation reference to "Model" 405 of the supplier "CellPhone" model 406. Note that the application 360 (only) marks URI references (i.e., supplier roots) to supplier models in the client root model. So if the present description indicates that a primary root, secondary roots, supplier root, supplier primary roots, supplier secondary roots, etc., are marked in the client root model (such "electronics" model), it is understood that application 360 is marking reference to the supplier model.

3. In the temporary framework 395 (which is a skeleton created in memory 320 during synchronization), the directed graph 500 is created as part of the processing by the application 360. It should be noted the directed graph 500 is utilized for the task of client model traversal by the application 360 and is not meant to be a limitation. From the perspective of placeholders created during supplier artifact (the supplier artifact could be any supplier model 402, 404, or 406 and/or any item in the supplier models 402, 404, 406) processing (traversal), the directed graph 500 is a unidirectional graph traversable in either direction by the application 360. As an example, for explanation purposes the application 360 may traverse from a client "CellPhone" node in the top down direction to the client "MeterViewer" node in the directed graph 500 but for the purpose of marking skeleton nodes that are placeholders (for foreign elements), the application 360 can traverse in either direction (up the directed graph in the opposite direction of the arrows and/or down the directed graph in the direction of the arrows). Skeleton nodes (which can be called placeholders) are created (by the application 360) in the temporary framework 395 to represent foreign elements, and once the definition (value and/or name) of the foreign element is found by the application 360, the definition is inserted in to replace the placeholder. As part of the custom traversal, only nodes belonging to the synchronization client (element) being synchronized like, e.g., "ACSource" (or those foreign to the synchronization client being synchronized but contained within the synchronization client's model and referenced from the synchronized client) are processed and created by the application 360. Element nodes that are neither defined nor referenced by the set of synchronization clients are discounted for the purpose of graph 500 creation. As an example, if the application 360 is synchronizing "electricalSource" with the supplier primary root of "CellPhone" model, application 360 will neither create nor have mentioned in the graph 500 elements such as "Transmitter" and "Receiver", since these elements are neither defined nor referenced by the "electricalSource" (or its constituents) that are undergoing synchronization. Apart from the nodes belonging to the element being synchronized, the only other nodes being processed and/or created by the application 360 are those nodes that serve as intermediaries to the synchronized node. Using the directed graph 500 above, if the "ACSource" node is being synchronized by the application 360, then "DCSource" node, "communicationController" node, "reset" node and all of their constituents are excluded from the digraph 500 by the application 360.

4. A client artifact corresponding to "CellPhone" node is used as a starting point (by the application 360) to reach any irresolvable nodes. In the above case, "ACSource" synchronization does not include synchronization of "MeterViewer". Consequently, the application 360 walks (i.e., traverses by following the arrows from one node to another) the containment hierarchy created via the directed graph 500, starting at the client "CellPhone" node to eventually arrive at the "MeterViewer" node. That is, the application 360 may traverse from the CellPhone node, to the Containment Root node, to the LogicalView node, to the utility node, to the metering node, and to the MeterViewer node. So as not to obscure diagraph 500, the Containment Root node is shown in FIG. 5, but in actuality the names of the N-ary roots (which are client "DigitalCamera", client "Laptop", and client "CellPhone") may be stacked on one another (as a single node) in the location of the Containment Root node. Note that the N-ary roots are client model roots and in the digraph 500, the client model roots are illustrated as nodes.

5. If somewhere down the client artifact (in this case the "CellPhone" model 412 traversal), the application 360 encounters an unloaded fragment (a node that has not been uploaded from memory 320), the application 360 aborts (as discussed in operation 817). Using other N-ary roots, such as client "Laptop" node and/or the "DigitalCamera" node follow the steps mentioned earlier in an attempt to resolve all the remaining nodes (e.g., to resolve foreign elements).

6. If for some reason, the application 360 is unable to traverse through any of nodes of the client root artifacts because of unloaded client models (as in operations 816 and 817), then the application 360 is configured to calculate the least costly client model to load and explicitly loads that particular client node(s) to resolve the references during synchronization (as discussed in operations 21-23). The nodes in the directed graph 500 can represent items in each of the client models 408, 410, 412, and 414 but every node may not be present in the directed graph 500 because each client model may not be loaded and/or only a portion of a (not the entire) client model may be loaded. In the directed graph 500 duplicate items of the client models 408, 410, and 412 are depicted as a single node and furthermore there exists only one placeholder corresponding to these duplicate items since we have only one unifying directed graph 500 created in the temporary framework 395. For example, when a particular client node is needed for traversal during synchronization, the application 360 determines which client model should be uploaded to create that particular client node so that the application 360 can access the particular client node in the directed graph 500.

Various features of the application 360 of the CA-Sync include but are not limited to the following as discussed below:

1. Model annotation during refactoring (of a client model) by the application 360 includes a non-invasive model marking. For example, annotations by the application 360 are employed to mark (URI) references multiple corresponding supplier roots. These annotations to client artifacts of client models do not interfere with the semantics. These annotations by the application 360 are to the client models not the supplier models, and these annotations in the client model refer back, reference, and/or point to the corresponding supplier model.

With regard to the concept of client exclusion, every synchronizable client artifact that has undergone such modification of containment hierarchy is flagged by the application 360 with an annotation signifying that the client artifact has been modified. This client exclusion allows the application 360 to disqualify client artifacts from searches for pristine clients artifacts (pristine clients artifacts continue to have their containment hierarchy similar to the containment hierarchy of their supplier model) that are manifesting supplier roots and are eligible candidates to be designated as starting points for graph traversal. Synchronizable denotes that a client artifact or fragment was originally built from a supplier model and thus can be synchronized back to that supplier model. For example, an annotation is made in "electronics" model 414 by application 360 so that subsequent searches will alert application 360 "electronics" model 414 has been modified from its original containment hierarchy.

2. N-ary roots: Though a single client model (such as the "CellPhone model" 412) might contribute the extracted out shareable entity (such as the "electricalSource"), multiple imported models (such as the "Digital Camera" model 408 and the "Laptop" model 410) might share in this particular shareable entity. Consequently, each of these N-ary roots ("Digital Camera" model 408, "Laptop" model 410, and "CellPhone" model 412) corresponding to each individual model is annotated (by the application 360) in the synchronizable client artifact as a likely candidate to assist in reference resolution (such as resolving a foreign element and/or resolving a node when trying to reach the foreign element).

3. Directed graph application: The application 360 creates the directed graph 500 (in the temporary framework 395) corresponding to the containment hierarchy which assists with recreation of the client artifact being synchronized.

4. Root leveraged normalization: The application 360 uses the root supplier (the URI) for the client artifact being synchronized to normalize client artifact's containment with respect to that of the supplier artifact. Since "ACSource" is being synchronized, the application 360 is configured to use the annotation (which is the URI pointing to supplier "CellPhone" model 406) in "electronics" model 414 to match (normalize) the containment hierarchy of "ACSource" in the "CellPhone" model 406.

5. Bottom up marking of nodes: unresolved references are walked up by the application 360 from the leaf to the root while marking all intermediary nodes that require resolving. In the directed graph 500, these nodes ("Digital Camera", "Laptop", and "CellPhone") are then followed (by the application 360) in a top down fashion starting at the client model (which is the "CellPhone" node representing the "CellPhone" model 412) corresponding to the supplier root. Hence only a subset of, e.g., an enormous model requires traversing, thereby limiting the traversal to only nodes participating with synchronization by the application 360. In "Digital Camera" model 408, "Laptop" model 410, and "CellPhone" model 412, the slanted arrow by "electricalSource" is an extracted out fragment which has turned "internal" into a leaf.

6. Client artifact linkability traversal: Though the extracted modeling artifact (e.g., "electricalSource") will contain a new containment hierarchy (as shown in the "electronics" model 414), the application 360 traverses paths starting from an N-ary root candidate (client models 408, 410, and 412 are all N-ary root candidates while "CellPhone" model 412 is the N-ary primary root), walking linkabilities as required to arrive at the reference element (e.g., "electricalSource" in "electronics" model 414). Walking linkabilities is tantamount to spring boarding off leafs to other independent models (such as spring boarding from the leaf "internal" to "electricalSource" in client model 414) to continue the containment hierarchy. In example implementations, the UML Element Import relation is used for bridging containment hierarchies (such as connecting the "CellPhone" model 412 to the "electronics" model 414 in the "PowerSource" project 413).

7. Resilient traversal: In case the primary client model (e.g., the "CellPhone" model 412) from which the shareable entity ("electricalSource") was extracted out is unavailable for traversal, alternate N-ary roots (such as "DigitalCamera" model 408 and/or "Laptop" model 410) can be determined and employed by the application 360, since each of the N-ary roots that share in the shareable entity are obliged to satisfy references to artifacts depended upon by the roots. In other words, since "CellPhone" model 412, "DigitalCamera" model 408, and/or "Laptop" model 410 are N-ary roots that depend on the shareable entity "electricalSource", the application 360 marks a URI to each respective supplier root. The models 408, 410, and 412 are called N-ary roots because each of the client root models 408, 410, and 412 can be utilized by the application 360 to reach the shareable entity ("electricalSource") when other ones of the root models are not uploaded from memory 320 (see operations 819).

8. Cost based single traversal (weighted digraph): With multiple N-ary roots (such client root model 412, 410, and 408), the application 360 is configured to choose which of the N-ary roots to load based on its cost. As calculated by the application 360, the cost of each route (in the directed graph 500) is based on the probable memory 320 requirements of loading unloaded fragments (from the client models) corresponding to each segment of the route. A single traversal (of the directed graph 500) is performed by the application 360 to calculate the costs of visiting the nodes from the multiple eligible roots. A single traversal is achieved by walking in a bottom up fashion the graph 500 in the temporary framework 395 towards the top level root from the unresolved leafs, visiting along the way the marked intermediary nodes. A fragment is the smallest unit of element that can be loaded in memory 320. Consequently a fragment comprising many nodes is heavier than a single node containing fragment. The application 360 maintains a cost bucket corresponding to each of the N-ary supplier roots. Each bucket represents the fragments that need to be loaded while traversing these marked nodes (these are nodes flagged as to be traversed). Hence at every node, assuming it is contained in a fragment different from those previously traversed (visited), the application 360 adds these newly encountered corresponding fragments to their respective buckets related to the N-ary supplier roots. Once the application 360 has traversed (visited) all the marked nodes with this single traversal, the application 360 is left with n buckets (containing fragments that further contained the marked nodes) corresponding to the N-ary supplier roots. Adding the number of elements contained in each of the fragments of a set, gives the cost of that particular bucket. The bucket with the least cost suggests the client model that would be least costly to load. For example, the application 360 can create the directed graph 500 without having to load the client models from memory 320. In some cases, part (and/or all) of the client models 408, 410, 412, and 414 may be already loaded from memory 320. When a particular route is needed, the application 360 can travel from any of the N-ary roots to reach the particular node (to resolve a foreign element) but the cost may not be the same.

9. Shortest path not chosen: As calculated by the application 360, the least costly model may consist of a path nodes that violates the shortest path strategy. The digraph 500 identifies the weights of loading nodes that are coded (with designs) to match client root models 408, 410, and 412. Using the "Laptop" root model 410 to resolve "MeterViewer" and "TripController", the application 360 determines that the least cost in terms of processor 310 and memory 320 usage is 3+1+1, whereas the shortest path to "MeterViewer" and "TripController" are DigitalCamera (2+1) and CellPhone (2+1) respectively.

The application 360 is configured to provide the following: 1. Enhanced model tooling refactoring capability: The logical strategy of the application 360 prevents curtailing of containment hierarchy related refactoring that would otherwise have broken synchronization. 2. Increased resiliency: The application 360 determines alternate routes (any of the N-ary roots can be utilized) for synchronization in case the primary participant is absent such as when the primary participant root model is unloaded (e.g., the "CellPhone" model 412 or part of the "CellPhone" model 412 is unloaded). Hence the application 360 ensures that synchronization proceeds by using alternate roots (N-ary roots) to reach nodes (elements). 3. Proactive approach: The application 360 can assist the user in determining which of the N-ary roots to use to complete synchronization. Hence the user is not required to be aware of dependency graphs between resources (client models) present in a workspace and therefore the application 360 eases the burden on the user having to explicitly load client models and constituent fragments explicitly. 4. Smaller memory footprint required: For the purpose of synchronization, the application 360 does not need to maintain a mapping between the numerous elements (of the client models) and their constituent elements, as the elements undergo refactoring. For example, no mapping table is required to be stored in memory 320 for the refactoring of "electricalSource" of "CellPhone" model 412. 5. Quicker time to completion: The custom traversal and the bottom up approach (by the application 360) of marking nodes ensures only the interesting subset (the part of the graph utilized for synchronization) of the digraph 500 is traversed.

In an implementation of exemplary embodiments, the CA-Sync of the application 360 may be implemented in JAVA™ technology, with the intent of synchronizing and thus reflecting changes made in the source models (such as the supplier "DigitalCamera" model 402, supplier "Laptop" model 404, and supplier "CellPhone" model 406) to their corresponding client models (such as the client "DigitalCamera" model 408, client "Laptop" model 410, and client "Cellphone" model 412, along with the client "electronics" model 414). In the implementation, XMI/UML meta-model based artifacts serve as client modeling artifacts which are synchronized against sources corresponding to, e.g., textual Rational Rose Real Time models for explanation purposes. Furthermore, the granularity of synchronization reflects UML Packages, although it is understood that exemplary embodiments could utilize a lower level of synchronization. Note that XML Metadata Interchange (XMI) is an Object Management Group (OMG) standard for exchanging metadata information via Extensible Markup Language (XML).

FIG. 6 illustrates a client model annotation diagram 600 that illustrates triggers for annotating client models by the application 360 in accordance with exemplary embodiments. As represented in FIG. 6, the three actions/actors 602, 604, and/or 606 illustrate triggers for annotating the client root model 608, which is generally represents any client root model (top level element, top element, root model). The three actions/actors 602, 604, and/or 606 may be received as inputs to the application 360, e.g., may be triggered by a user (via the mouse 170) performing one of the triggers. Additionally, the triggers/actions 602, 604, and/or 606 may be an external software application (on the computer 100) that interfaces with the application 360 so that the application 306 can receive the triggers/actions 602, 604, and/or 606.

Extract Artifact 602: Any time the application 360 extracts out a synchronizable fragment (e.g., a UML Package such as "electricalSource"), this refactored fragment is annotated by the application 360. If the refactored fragment is the client root model, the refactored fragment itself is annotated (e.g., as in FIG. 9). However, in FIG. 4, this refactoring out of a portion of the client model results in the extracted portion ("electricalSource") obtaining a new containment hierarchy (e.g., in the "electronics" model 414, and as such, the "electronics" model 414 is annotated by the application 360.

Convert to Synchronizable 604: It is also possible that a first class model is created which is subsequently made a client by binding it to a source. In this case again, the client root model is marked with annotations by the application 360. For example, the "electricalSource" model 905 (in "electricalSource" project 900) may be created as a first class model and then bound to a source such as to the supplier "Cellphone" model 406. Binding to the source has the "electricalSource" model 905 to be synchronizable, and the application 360 marks (annotates) in the client "electricalSource" model 905 the URI to the supplier "CellPhone" model 406.

Share Artifact 606: When additional models are created and/or converted and contain pre-existing bindings to the supplier model, and when the application 360 discovers (e.g., receives the trigger 606 or parses to determine) that the shareable portion (such as "electricalSource") has already been extracted out for a previously created model, this newly created/converted model may share the extracted synchronizable portion instead of creating a duplicate. In such a scenario, the application 360 is configured to add (annotate) in the shareable portion's client root model the additional supplier root (URI) corresponding to the newly client created/converted model, thereby contributing to (increasing the number of) the N-ary redundant roots available for synchronization by the application 360. The synchronizable fragment that suffers containment hierarchy modification might either be housed directly as a root UML package (e.g., as a separate independent client model as discussed herein) thus making it a top level element in its own right, and/or might instead be nested within a pre-exiting model (such as nested within the "electronics" model 413).

The following is an example to illustrate the fragment being contained in a client model: In the case when the fragment is in a nested model (such as "electronics" model 413), the application 360 would mark the following annotations at the UML Model Level:

```
<eAnnotations xmi:id="id1"
  source="com.ibm.xtools.umldt.rt.petal.ui.Extracted" />
<eAnnotations xmi:id="id2 "
  source="com.ibm.xtools.umldt.rt.petal.ui.RoseRTMainUnitInfo" >
      <details xmi:id="idA " key="Model1.rtmdl"
      value="1260934934928" />
      <details xmi:id="idB " key="Model2.rtmdl"
      value="1260934934928" />
</eAnnotations>
```

Extracted (flagged) annotation: The annotation "com.ibm.xtools.umldt.rt.petal.ui.Extracted" is used to mark models that contain extracted synchronizable models as a result of refactoring.

N-ary roots annotation: The annotation "com.ibm.xtools.umldt.rt.petal.ui.RoseRTMainUnitInfo" is used to refer to the multiple supplier models that would qualify as containers of the refactored fragments presently contained in this annotated client model.

Below are the annotations by the application 360 for the extracted "electricalSource" synchronizable fragment that is contained in a new model named "electronics" model 414 housed in the project "PowerSource" 413, and the "electricalSource" synchronizable fragment is shared by both the client "DigitalCamera" model 408 and "Laptop" model 410.

```
<eAnnotations xmi:id="_5o6SyfSoEd642-zofm1g3w" source=
"com.ibm.xtools.umldt.rt.petal.ui.Extracted" />
      <eAnnotations xmi:id="_5pNNsPSoEd642-zofm1g3w" source=
"com.ibm.xtools.umldt.rt.petal.ui.RoseRTMainUnitInfo" >
          <details xmi:id="_5pNNsfSoEd642-zofm1g3w" key=
"E:\model\DigitalCamera\DigitalCamera.rtmdl"
value="1260934934928" />
          <details xmi:id="_5pNNsfSoEd642-zofm1g3z"
key="E:\model\CellPhone\CellPhone.rtmdl" value
="1260934934928" />
</eAnnotations>
```

By the application 360, the above annotations are applied at the model root level to "electronics" model 414 and the above annotations flag the "electronics" model 414 with the "Extracted" annotation to suggest that the "electronics" model 414 contains synchronizable fragments. The N-ary roots that the application 360 leverages off for synchronization are the supplier models: supplier "DigitalCamera" model 402, and the supplier "CellPhone" model 406. In the example code above "key=" is the path to the corresponding supplier model that is being synchronized too. So key="E:\model\DigitalCamera\DigitalCamera.rtmdl" indicates that the application 360 is synchronizing to supplier "DigitalCamera" model 402, and key="E:\model\CellPhone\CellPhonestmd.l" indicates that the application 360 is synchronizing to supplier "CellPhone" model 406. The above paths are annotated by the application 360 in the "electronics" model 414 and are thus readily available to the application 360 when synchronizing. Note that Rtmd1 is just a file extension.

Below are the annotations by the application 360 if the extracted fragment is a non-contained fragment (such as the "electricalSource" model 905): In such a case, the extracted fragment itself is the top level root, and the following annotation is applied (marked) by the application 360 to the top level UML Package instead:

```
<eAnnotations xmi:id="id1"
  source="com.ibm.xtools.umldt.rt.petal.ui.Extracted" />
<eAnnotations xmi:id="id2 "
  source="com.ibm.xtools.umldt.rt.petal.ui.RoseRTMainUnitInfo" >
      <details xmi:id="idA " key="Model1.rtmdl"
      value="1260934934928" />
      <details xmi:id="idB " key="Model2.rtmdl"
      value="1260934934928" />
      details xmi:id="idC " key="Pkg.rtlogpkg"
      value="1260934934928" />
</eAnnotations>
```

As can be seen, the annotations (by the application 360) are similar to those applied at the model level (for "electronics" model 414) with one difference. When the fragment which in this case is a package is annotated, since the fragment ("electricalSource") is a top level fragment, the application 360 adds to the RoseRTMainUnitInfo an additional root which is the supplier artifact against which the application 360 is to synchronize.

In such a case the annotation applied to the "electricalSource" model 905 would be

```
<eAnnotations xmi:id="_5o6SyfSoEd642-zofm1g3w" source=
"com.ibm.xtools.umldt.rt.petal.ui.Extracted" />
    <eAnnotations xmi:id="_5pNNsPSoEd642-zofm1g3w" source=
"com.ibm.xtools.umldt.rt.petal.ui.RoseRTMainUnitInfo" >
        <details xmi:id="_5pNNsfSoEd642-zofm1g3w" key=
"E:\model\DigitalCamera\DigitalCamera.rtmdl"
value="1260934934928" />
        <details xmi:id="_5pNNsfSoEd642-zofm1g3z"
key="E:\model\CellPhone\CellPhone.rtmdl" value
="1260934934928" />
key="E:\model\ElectricalSource\electricalSource.rtlogpkg"
value="1260934934928" />
</eAnnotations>
```

Figure 7:
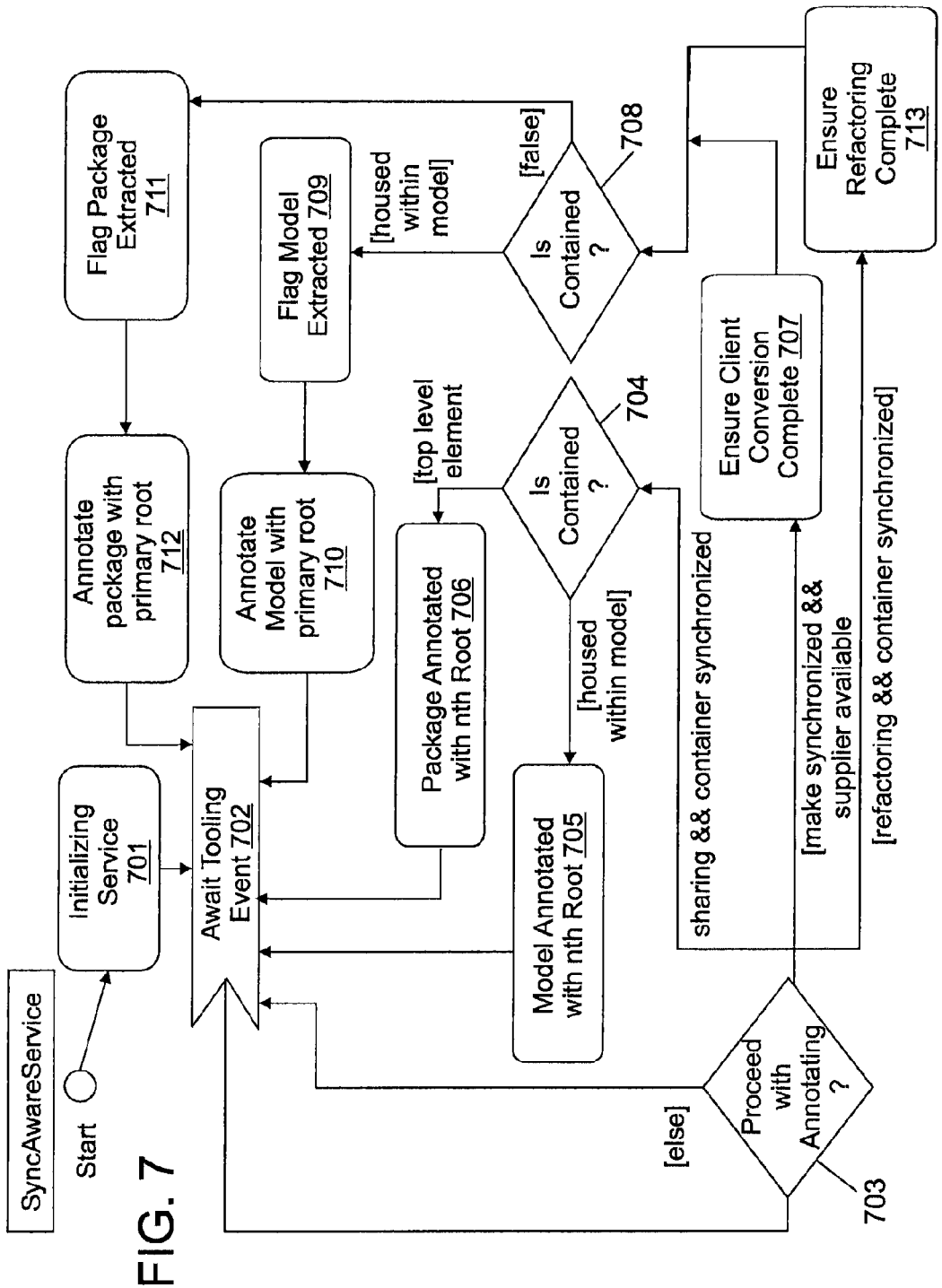
FIG. 7 illustrates a process for a synchronization aware service in accordance with exemplary embodiments.

FIG. 7 illustrates process 700 for client model annotation in a synchronization aware service by the application 360 in accordance with exemplary embodiments. At operation 701, the application 360 is configured to initialize service, which pertains to bootstrap activities (boot up process) including registering the application 360 as a service to be invoked on refactoring. At operation 702, the application 360 is configured to await (listen for) a tool event and the service of the application 360 receives as input each of the tooling actions for the category that trigger annotations. The category may include the triggers/actions 602, 604, and/or 606, which in this case pertains to refactoring.

At operation 703, the application 360 is configured to proceed with annotating. Although the application 360 is configured to listen for every refactoring event, the application 360 is configured to act upon (only) those refactoring events that satisfy certain conditions. In case the event does not satisfy any one of the conditions (as determined by the application 360), the application 360 continues to wait for other events. Based on the event and condition, the output of operation 703 takes one of three branches by the application 360. One event is sharing (box 606) and condition satisfied is container synchronized, and the application 360 branches to operation 704. A second event make synchronized (box 604) and condition satisfied is supplier available, and the application 360 branches to operation 707. A third event is refactoring (box 602) and condition satisfied in container synchronized, and the application 360 branches to operation 713.

At operation 704, the application 360 determines if the shareable portion (i.e., such refactored fragment) is contained. The application 360 is configured to check if the shareable portion is contained as a root model (e.g., broken out into its own root model as shown in "electricalSource" model 905), and/or instead if the shareable portion is nested (in another model such as the "electronics" model 414) thereby preserving the shareable portion's original inheritance hierarchy.

If the shareable portion is determined by the application 360 to be nested in a model (i.e., housed within the "electronics" model 413), the application 360 annotates the model with the N-ary root (URI) of the supplier model at operation 705. In cases where it is determined (e.g., by the application 360) that a client model is being created from a supplier model and the client model contains a synchronizable portion that has previously been imported (created), the application 360 attempts to use this preexisting shared fragment instead of creating a duplicate. In such cases where the shareable portion is nested (like "electricalSource" in "electronics" model 414), the application 360 annotates the top most element with this additional supplier root that corresponds to this newly created client model that shares in the preexisting synchronizable portion. For example, when "CellPhone" model is the primary N-ary root and its supplier root has been annotated in "electronics" model 414, a newly created "DigitalCamera" model 408 or "Laptop" model 410 can share the preexisting synchronizable shared fragment "electronics" model 414; the supplier roots of the model 408 and 410 are annotated in "electronics" model 414 and the models 408 and 410 are secondary N-ary roots.

If the shared portion (refactored fragment) is determined by the application 360 to be the top level element in its own model (e.g., in "electricalSource" model 905), the application 360 annotates the package with an additional supplier root (URI) which corresponds to the client model that is sharing in this portion at operation 706.

At operation 707, the application 360 is configured to ensure (determine) that client conversion is complete. For shareable portions that are later discovered as synchronizable and related to some supplier model, the application 360 is configured ensure that the conversion process to a shareable portion prior to modifications to prepare for synchronization. It is important for the event to complete prior to Sync Aware Service driven modifications of the application 360. For example, the application 360 ensures that "electricalSource" model 905 is bound to supplier "Cellphone" model 406.

At operation 708, the application 360 is configured to determine if the shareable portion is contained as in operation 704. Different controls are followed by the application 360 depending on whether the shareable client portion is contained or is top level element. At operation 709, the client root model of the shareable client portion is flagged as model "Extracted" by the application 360. The shareable client portion's container, i.e. the "electronics" model 414 is marked as "Extracted". This annotation is done on the client root model rather than the contained shareable portion, since the shareable portion is nested.

At operation 710, the application 360 annotates the client root model with supplier primary root. The client root model is marked with the primary root supplier corresponding to the client model which shares in this shareable portion. For example, since "electronics" is extracted from client "Cellphone" model 412, the "electronics" model 414 is marked with the primary supplier root (URI) pointing to the supplier "Cellphone" model 406. At operation 713, the application 360 ensures that (or waits until is) refactoring complete. The task of preparing clients for synchronization is to occur only after the primary refactoring task is complete.

At operation 711, the application 360 annotates the shareable portion (package), which is itself the top level element (i.e., client root model), with a flag indicating package extracted. At operation 712, the application 360 annotates the shareable portion the shareable portion (package), which is itself the top level element (i.e., client root model), with the N-ary primary root. The shareable portion (package) that is synchronized has the supplier root annotated in it. This supplier root again corresponds to the client model that shares the shareable portion.

Figure 8A:
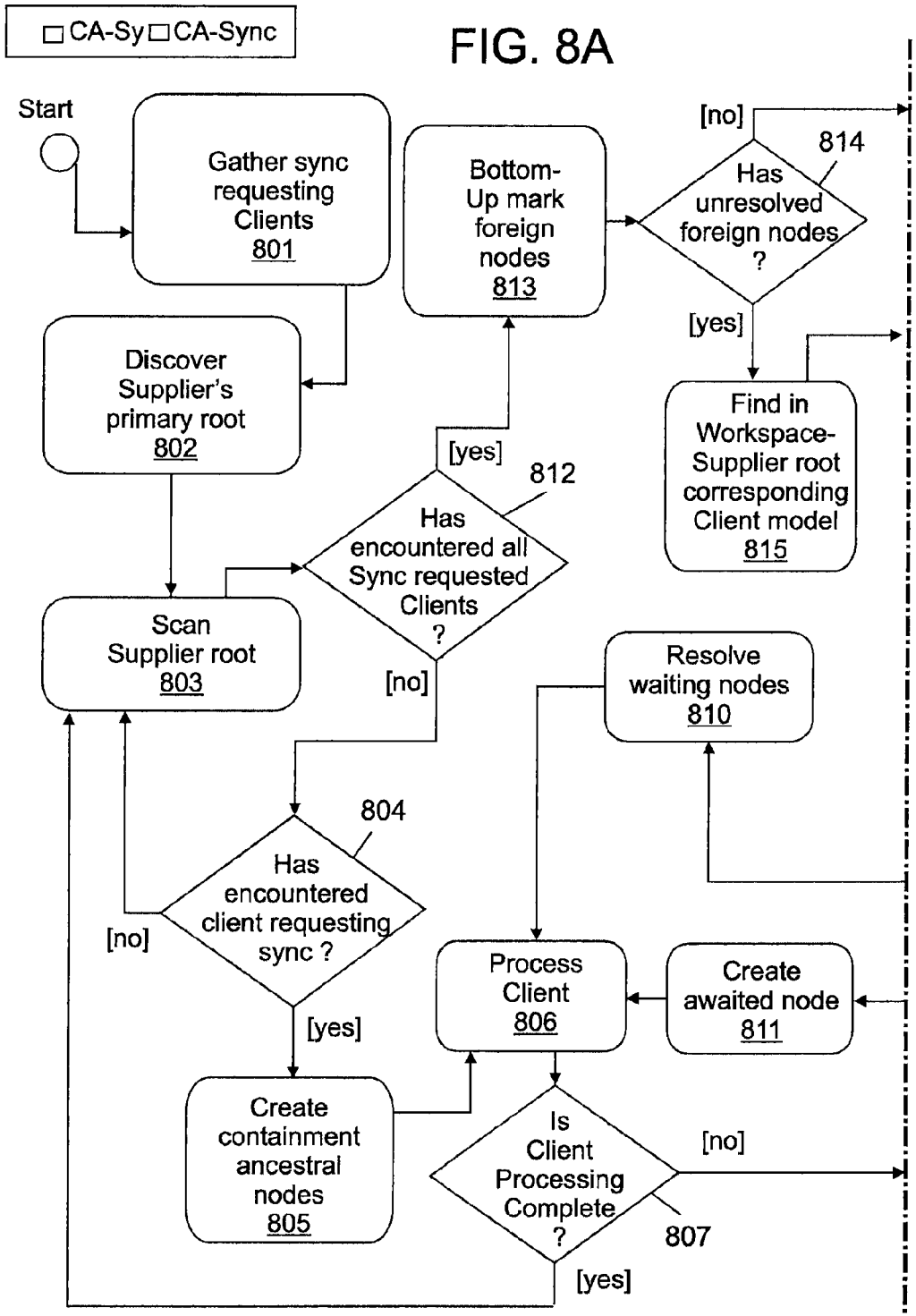
FIG. 8 illustrates a process for synchronization of clients in accordance with exemplary embodiments.

The Sync aware service of the application 360 ensures client artifact compatibility for synchronization. FIG. 8 illustrates a process 800 of synchronization by the application 360 in accordance with exemplary embodiment.

At operation 801, the application 360 gathers all synchronizing requesting clients. It is possible for the application 360 to synchronize multiple client fragments shared by the same client model (e.g., shared by client "CellPhone" model 412. This task by the application 360 is to collect and store these synchronizable clients for later processing.

At operation 802, the application 360 (parses the client "CellPhone" model 412) discovers the supplier's primary root (URI). Since each of the synchronizable client fragments is sharing the same set of common supplier roots, the application 360 selects a synchronizable client fragment and discovers the URI of the supplier that serves as its primary root. The URI is the path to the supplier model file.

At operation 803, the application 360 scans the supplier root (e.g., scans supplier "CellPhone" model 406). This involves processing the supplier artifact reached via the URI discovered during the previous step. For example, if the synchronizable client fragment is "electricalSource", the application 360 searches to find the corresponding supplier "electricalSource" in the supplier "CellPhone" model 406.

At operation 812, the application 360 determines if it has synchronized all synchronizing requested clients. This is more of an optimization step, which states that that application 360 is not obliged to continue processing the supplier model until its end, in cases where all the fragments being synchronized have been encountered.

At operation 804, the application 360 determines if it has encountered (a particular) client requesting synchronization. The fragment undergoing synchronization is a small subset of the supplier model. While parsing (traversing) through the supplier model (e.g., supplier "CellPhone" model), the application 360 searches to find the definition of the fragment being synchronized. This detection could be done in various ways. In one implementation, the application 360 utilizes the URI of the supplier fragment to match against the URI of the nested resource being scanned, and the supplier fragment is reached via the scanning of the supplier model. As an example assume that one is synchronizing "electricalSource". The supplier "electricalSource" could possibly be serialized on disk in a resource whose URI could be "E:\model\electricalsource.rtlogpkg". Assuming that the primary root URI was "E:\model\CellPhonestmld", the application 360 would start to scan this particular find, until the application 360 encounters a reference to the URI "E:\model\electricalsourcestlogpkg". In which case, the application 360 has detected the nested location of the continuing model definition for "electricalSource".

At operation 805, the application 360 creates the containment ancestral nodes for the synchronizing client fragment. Tracing back from the matched fragment, the application 360 creates (in the temporary framework 395) all the nodes including that of the matching supplier fragment, up to the supplier root; this manifests the containment hierarchy of the supplier model in the temporary framework 395. An objective of this step is to correctly position the node of the resource being synchronized in the correct containment hierarchy in the temporary framework 395. If "electricalSource" is being synchronized, the application 260 would create the "electricalSource" node, "internal" node, LogicalView" node, and "Containment Root" node in the digraph 500 in the temporary framework 395.

At operation 806, the application 360 processes the client being synchronized, which is processing this sub-graph constituting the contents of the fragment being synchronized. In the temporary framework 395, the application 360 constructs a copy of the supplier resource of the supplier model that corresponds to the client fragment being synchronized, which will eventually replace the client fragment being synchronized. Note that the application 360 continues to build the temporary framework 395 in memory 320 to correctly position each synchronizable fragment gathered in operation 801. For example, the application 360 reads the file (which may be located in memory 320 or on a disk) for "electricalSource", and copies the contents of "electricalSource" in the temporary framework 395.

At operation 807, the application 360 determines if the client processing of the copy building the temporary framework 395 is complete. This pertains to ensuring (i.e., waiting) that the processing of this particular supplier resource being used for synchronization is complete out of the many clients presently undergoing synchronization.

At operation 808, when a reference to another client artifact (element) is found, the application 360 determines if it can create client artifact. Synchronization involves the processing of the supplier to create a model artifact that is compatible with the client model artifact. In our case while processing the corresponding supplier the application 360 recreates (in the temporary framework 395) the supplier in terms of the client format, in an attempt to update the client. Certain constituents can be easily created (since they have no external dependencies) such as a UML Class with no dependencies, while others involve references to elements that are external such as the target of a generalization. This step determines which of the two types of element has been encountered. One that can be created or the other type, i.e., pertaining to foreign elements. When processing "electricalSource" a reference to "MeterViewer" may be found but the definition (value) for "MeterViewer" is not in the "electricalSource" file. As such, the application 360 would create a placeholder for "MeterViewer" in the graph 500 in the temporary framework 395 at operation 811. Note that this placeholder includes the "MeterViewer" node and all of its ancestral nodes all the way to the root but the placeholder does not have a value at this time. Also, note that the reference to "MeterViewer" includes its fully qualified name, and as such, the application 360 can create and position the ancestral nodes for "MeterViewer".

At operation 809, the application 360 creates client element (found in the dependency relationship). This refers to encountering sub-elements that are owned by the client being synchronized and consequently can be created independently by the application 360 to add to the temporary framework 395. The temporary framework 395 is a skeleton that represents nodes (elements) in the supplier model (and any foreign elements that are not resolved by having a value/definition are represented with a placeholder node/element).

At operation 810, the application 360 resolves any waiting nodes (awaited nodes). Once an element is created, there could have been other nodes awaiting creation of this element represented by this node. In such cases those awaiting (listening) elements are resolved by the application 360 if that element was created in operation 809.

At operation 811, it is determined that the application 360 can not create the client artifact, and the application 360 creates an awaited node which is the placeholder in the temporary framework 360. The awaited node (placeholder) represents the inability to create the corresponding element, either because the element is contained external to the resource being synchronized or the element is owned by this very supplier (model) resource but has not been encountered yet (during processing in operation 806). In either case, an awaited node is created in the temporary framework 395 for this awaited element, and the application 360 listens for completion of this awaited node when other clients (gathered in operation 801) are being synchronized. For example, an awaited nodes (i.e., which may become a foreign node if the application 360 does not encounter the referenced client artifact) is contained in the synchronization of another client, and this foreign node would be resolved by adding the definition (value) into the foreign node placeholder.

After the application 360 has encountered (found in the supplier model) all the clients requesting synchronization in operation 801, the application 360 bottom-up marks the foreign nodes (i.e., foreign elements, awaited nodes) in the graph 500 of the temporary framework 395 in operation 813. The unresolved nodes are discovered and marked as to be traversed and then followed via their intermediary nodes to the root. There is an optimization to following the bottom up approach instead of the top down, since the amount of graph created in the temporary framework 395 (which would be similar to digraph 500 except with unresolved foreign nodes) that is needed at the time of client artifact reference resolution traversal is minimal. For the unresolved reference (which is a foreign element) "MeterViewer", the application 360 marks the placeholder for "MeterViewer" as to be traversed, which means that the "MeterViewer" node and all of its upper nodes are marked at to be traversed in the graph 500 of the temporary framework 395. Assuming "TripController" was also a foreign node that needed to be marked, we would mark only up to (through) reset, since utility and other ancestors were already marked during the effort of marking the ancestors of MeterViewer, and thus the optimization with the bottom up approach.

At operation 814, the application 360 checks if there are any unresolved foreign nodes (any placeholders) in the temporary framework 395. The previous step at operation 813 would help to implicitly discover the unresolved nodes. Operation 814 is explicit in confirming if the application 360 has any unresolved references which are dependency relationships to foreign elements that have been marked as placeholders (awaited nodes) in the temporary framework 395. For every self-contained client resource that is being synchronized, the application 360 would not be returned any unresolved nodes. It is also possible that all the unresolved nodes happened to be contained in the set of synchronized client resources that were together being processed, and in this case also there would be no unresolved resources.

If there are unresolved foreign nodes, the application 360 would find (in the workspace) the supplier root corresponding client models at operation 815. The workspace containing the client models is scanned by the application 360 for client models that are annotated with the supplier URI corresponding to the (supplier primary root) client fragments that are being synchronized. Here the extracted flag comes into play and the application 360 would discount (not include) client models that have this flag attached to them. For example, since client "CellPhone" model 412 is originally copied from supplier "CellPhone" model 406, the application 360 would find the supplier root (URI to supplier "CellPhone" model 406) in the client "CellPhone" model 412. Although the client "electronics" model 414 includes the suppler root URI to supplier "CellPhone" model 406, the client "electronics" model 414 is rejected because it has the annotation "Extracted" flagged, At operation 816, the application 360 checks if the corresponding client model is loaded. It is quite possible that the client model corresponding to the supplier root is in an unloaded state.

If the corresponding client model is loaded, the application 360 walks down the client model (using the recreated client model produced in operations 805, 809 and 811 in the temporary framework 395) and checks whether the application 360 encounters an unloaded node on the way at operation 817. In case the client model is already loaded, starting at the client root model, the application 360 walks down to (locate) the previously marked unresolved nodes via the intermediary marked nodes, following the client model. This would entail walking down the containment hierarchy of the client model. Quite commonly, the application 360 would come across children that are contained in external projects (such as "electricalSource" in the "PowerSource" project 413). In such cases the application's 360 traversal involves a jump to the corresponding external client resource. For all the outstanding unresolved nodes to be resolved by jumping to external projects, the application 360 should encounter only loaded fragments along the way, because an unloaded fragment in the path would return a Boolean value of false.

If the operation 817 did not encounter any unloaded fragments, the application 360 finds the definition (value) to foreign nodes in the corresponding client model and resolves the foreign node in the temporary framework 395 at operation 818. Since the application 360 did not know until the last of the unresolved references has been walked in the corresponding client model as to whether the application 360 would encounter an unloaded fragment, in the previous step of operation 817 the application 360 collected (in the temporary framework 395) all the values from the corresponding client model for the unresolved nodes but never applied them. In operation 818, the application 360 actually applies these values (fills in the placeholder with the definition found in the corresponding client model) to resolve the foreign nodes in the temporary framework 395.

At operation 819, the application 360 finds another supplier root corresponding to the particular client fragment being synchronized. In operation 817, on finding a node in the client model to which the application 360 could not traverse because of encountering an unresolved reference, the application 360 abandons the traversal and then in operation 819 it finds based on the supplier root another corresponding client model to use. This client model root is too used for traversal to find the foreign nodes. In other words, the application 360 finds and traverses secondary N-ary client model roots. So if an unloaded node is found in the primary N-ary client model, the application 360 will traverse the secondary N-root client models. For example, since "electricalSource" has the reference to "MeterViewer" which is a foreign element, the application 360 in operation 819 searches for annotations in "electronics" model 414 (which is the root model for "electricalSource") to determine secondary N-ary supplier roots. The "electronics" model 414 has a secondary N-ary supplier root to supplier "DigitalCamera" model 402 (and also supplier "Laptop" model 404). In operation 819, the application 360 searches for client models having as their source supplier "DigitalCamera" model 402, and finds client "DigitalCamera" model 408. In operation 817, the application 360 traverses down the client "DigitalCamera" model 408 to find the value for each foreign node in client "DigitalCamera" model 408 that corresponds to the nodes marked as to be traversed (which are the foreign element placeholders) in the digraph 500 of the temporary framework 395. In other words, the foreign nodes marked as to be traversed are instructions to the application 360 for traversing the client "DigitalCamera" model 408.

At operation 820, the application 360 continues to check whether there are any more N-ary roots. This represents an explicit decision of seeing if the application 360 has run out of candidate supplier roots. In other words all our N-ary roots have been exhausted.

When there are no more N-ary roots, the application 360 determines the cost for loading every supplier root N-ary client root model at operation 821. The application 360 utilizes an intelligent technique to find the client model (N-ary client root model) that should be loaded that has the least cost. In our implementation the cost associated with each node (in the client root model) is the additional memory footprint (memory 320 usage) required to load it. This is symbolically represented with a value associated with the quantity of elements (other nodes not related to resolving the foreign element) deemed expensive, that would also get loaded while loading the fragment (node). The application 360 employs a dynamic programming strategy to prevent multiple traversals; the application 360 uses a bottom up approach, starting from the leaf unresolved node (corresponding to the foreign element), working its way up to the client model root (top level element). On encountering an already visited element in the client model, the application 360 halts the traversal. Furthermore at each node the application 360 visits, the application 360 calculates the cost of loading that particular node for all the N-ary roots (N-ary client models). An example of the technique for calculating the cost (by the application 360) of each loading each node is provide using the digraph 500:

Synchronizing for "ACSource" and "DCPowerUnit", would involve resolving "MeterViewer" and "TripController". Staring at "MeterViewer" the application 360 works bottom up, marking the cost at each node. Say the application 360 starts with "MeterViewer", it encounters "metering". The application 360 collects the cost of loading "MeterViewer" node, which is "3" for "Digital Camera", "1" for "Laptop" and "1" for "CellPhone" into the three buckets for each of the 3 N-ary roots. The application 360 then encounters "utility" where the application 360 adds to the buckets the additional cost of 2, 3, 2 for "DigitalCamera" bucket, "Laptop" bucket, and "CellPhone" bucket respectively. The application 360 continues the above until the application 360 reaches the "Containment Root" because "Containment Root" represents the client "DigitalCamera" root, client "Laptop" root, and the client "CellPhone" root all in one. The application 360 follows the same strategy for the remaining unresolved nodes including, e.g., "TripController". Note that the solid line nodes in the digraph 500, such as "Misc 1" have to be loaded for the "utility" node regardless of the "N-ary" root client model, since Misc1 is shared along with the utility node in a fragment for each of the N-ary models. It is to be noted that for Trip Controller, the application 360 will not need to recompute the cost of ancestors such as utility, since they were already visited during the bottom up cost determination effort with MeterViewer. This is further explained in the point below.

The point here is that on traversing up the nodes in the diagraph 500, when the application 360 encounters an already visited node, which in this case would be "utility", the application 360 halts the upward traversal to any of the subsequent nodes. Hence using this strategy the algorithm of the application 360 achieves linear computation with complexity O(n).

Note that the cost for each node can be known in advance. For example, the application 360 can receive a predefined cost for loading each node of the N-ary clients, and utilize the N-ary client model with the least cost.

At operation 822, the application 360 chooses the least costly model based on operation 821. Reaching this point implies that to be able to resolve all of the foreign nodes requires that one of the (N-ary) client models be explicitly loaded by the application 360, and the application 360 chooses the one with the least amount of weight. At operation 823, the application 360 loads the least costly model, and its entire constituents which might actually require loading additional fragments not being synchronized; then the application 360 proceeds to operation 818.

After the temporary framework 395 is completed for the clients being synchronized and the foreign element (foreign nodes) have values, the application 360 replaces the client being synchronized with its respective copy (reflection) from the temporary framework 395. In operations of FIG. 8, the temporary framework 395 is continuously being built and placeholders are being filled in with their values, so that all the clients and their dependency relationships are constructed in the temporary framework 395. The temporary copy in the temporary framework 395 is finalized and replaces the client at the finish of the control flow depicted in FIG. 8.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for annotating and synchronizing on a device, comprising:
  marking a client root model of a plurality of fragments with annotations in response to triggers received by an application of the device, the triggers comprising extract artifact, convert to synchronizable, and share the artifact;
  wherein marking the client root model of the plurality of fragments with annotations comprises:
    in response to any of the plurality of fragments being extracted out and flagged with an extracted out flag, marking the client root model with annotations;
    in response to binding any of the plurality fragments to a source being a supplier model, marking the client root model of the plurality of fragments with annotations and marking the client root model as flagged; and in response to sharing in any of the plurality of fragments, marking the client root model with annotations;

determining, by the application of the device, the client root model having the supplier model as the source for the client model; and rejecting, by the application of the device, the client root model during a synchronization process based on the client model having the extracted out flag in which the extracted out flag causes the client root model to be excluded.

2. The method of claim 1, further comprising in response to a request to synchronize the plurality of fragments being shared by a sharing client model, finding annotations in the client root model of the plurality of fragments referring to a supplier model;

synchronizing 1-J of the plurality of fragments, wherein J is a last of the plurality of fragments being synchronized, wherein synchronizing occurs for each of the plurality of fragments and synchronizing for each of the plurality of fragments comprises:

scanning the supplier model to match a supplier file to a processing fragment of the plurality of fragments, wherein when the supplier file is matched in the supplier model, the scanning stops;

for the supplier file, creating an ancestor containment hierarchy, wherein the ancestor containment hierarchy starts with the supplier file and ends at a supplier primary root of the supplier model;

creating a copy of the supplier file in a temporary framework reflecting a subset of the supplier model corresponding to the plurality of fragments being synchronized; and if it determined that there is reference to a foreign element in the supplier file, resolving the foreign element when synchronizing at least one of a previous processing fragment and subsequent processing fragment, wherein a containment hierarchy of the foreign element is added in the temporary framework.

3. The method of claim 2, further comprising when the foreign element referenced in the supplier file can not be resolved by, synchronizing at least one of the previous processing fragment and subsequent processing fragment, traversing the supplier model upward from the foreign element to the supplier root of the supplier model, wherein elements traversed are marked in the temporary framework as to be traversed; and wherein the elements marked as to be traversed are a placeholder in the temporary framework.

4. The method of claim 3, wherein respectively synchronizing for each of the plurality of fragments causes the temporary framework reflecting the supplier model to be incrementally created as each of the plurality of fragments is synchronized; and wherein the temporary framework is stored in memory of the device.

5. The method of claim 4, wherein each of the plurality of fragments is replaced with a respective copy from the temporary framework reflecting the supplier model.

6. The method of claim 3, further comprising traversing the client model from the top downward to the foreign element, wherein the traversing of the client model corresponds to the elements marked as to be traversed in the temporary framework; and resolving the foreign element based on the value for the foreign element found when traversing the client model, wherein for the value for foreign element found when traversing the client model, add the value for the foreign element in the placeholder in the temporary framework.

7. The method of claim 6, further comprising if the client model is unloaded or if when traversing the client model an unloaded element is reached, determining another client model; and traversing the other client model from the top downward to the foreign element, wherein traversing in the other client model corresponds to the elements marked as to be traversed in the temporary framework;

resolving the foreign element based on the value for the foreign element found when traversing the other client model, wherein for the value for the foreign element found when traversing the other client model, add the value for the foreign element in the placeholder in the temporary framework.

8. The method of claim 7, further comprising when traversing has been attempted for all the client models to resolve the foreign element and it is determined that all the client models are unloaded, determining a least costly client model of all the client models to load;

wherein determining the least costly client model comprises determining a memory footprint for each of all the client models based on a memory requirement for loading nodes to reach the foreign element; and loading the least costly client model from memory.

9. The method of claim 8, further comprising traversing the least costly model from the top downward to the foreign element; and resolving the foreign element based on the value for the foreign element found when traversing the least costly client model, wherein for the value for the foreign element found when traversing the least costly client model, add the value for the foreign element in the placeholder in the temporary framework.

10. The method of claim 9, further comprising replacing each of the plurality of fragments a respective copy from the temporary framework reflecting the supplier model.

11. The method of claim 10, wherein the foreign element represents a plurality of foreign elements;

further comprising at least one of:

resolving some of the plurality of foreign elements for the processing fragment when the subsequent processing fragment is being synchronized; and resolving some of the plurality of foreign elements for the previous processing fragment when the processing fragment is being synchronized.

12. The method of claim 10, wherein synchronizing the previous processing fragment prevents the foreign element from becoming an issue to resolve for the processing element.

13. The method of claim 10, wherein synchronizing for the subsequent processing fragment resolves the foreign element for the previous processing fragment without having to determine a client model having the supplier model as the source for the client model.

14. The method of claim 1, wherein the client root model represents a plurality a client root models, and wherein the plurality of fragments at least one of:

share ones of the plurality of client root models;

are themselves respective ones of the plurality of client root models; and are nested in ones of the plurality of client root models.

15. A device for annotating and synchronizing, comprising:
- memory for storing a program; and
- a processor, functionally coupled to the memory, the processor being responsive to computer-executable instructions contained in the program and operative for:
- marking a client root model of a plurality of fragments with annotations in response to triggers received by the program, the triggers comprising extract artifact, convert to synchronizable, and share the artifact;
- wherein marking the client root model of the plurality of fragments with annotations comprises:
  - in response to any of the plurality of fragments being extracted out and flagged with an extracted out flag, marking the client root model with annotations;
  - in response to binding any of the plurality fragments to a source being a supplier model, marking the client root model of the plurality of fragments with annotations and marking the client root model as flagged; and
  - in response to sharing in any of the plurality of fragments, marking the client root model with annotations and marking the client root model as flagged;
- determining the client root model having the supplier model as the source for the client root model; and
- rejecting the client root model during a synchronization process based on the client root model having the extracted out flag in which the extracted out flag causes the client root model to be excluded.

16. The device of claim 15, further comprising in response to a request to synchronize the plurality of fragments being shared by a sharing client model, finding annotations in the client root model of the plurality of fragments referring to a supplier model;
- synchronizing 1-J of the plurality of fragments, wherein J is a last of the plurality of fragments being synchronized, wherein synchronizing occurs for each of the plurality of fragments and synchronizing for each of the plurality of fragments comprises:
  - scanning the supplier model to match a supplier file to a processing fragment of the plurality of fragments, wherein when the supplier file is matched in the supplier model, the scanning stops;
  - for the supplier file, creating an ancestor containment hierarchy, wherein the ancestor containment hierarchy starts with the supplier file and ends at a supplier primary root of the supplier model;
  - creating a copy of the supplier file in a temporary framework reflecting the supplier model; and
  - if it determined that there is reference to a foreign element in the supplier file, resolving the foreign element when synchronizing at least one of a previous processing fragment and subsequent processing fragment, wherein a containment hierarchy of the foreign element is added in the temporary framework.

17. The device of claim 16, further comprising when the foreign element referenced in the supplier file can not be resolved by synchronizing at least one of the previous processing fragment and subsequent processing fragment, traversing the supplier model upward from the foreign element to the supplier root of the supplier model, wherein elements traversed are marked in the temporary framework as to be traversed; and
- wherein the elements marked as to be traversed are a placeholder in the temporary framework.

18. The device of claim 17, further comprising determining a client model having the supplier model as a source for the client model; and
- rejecting any client model having an extracted flag.

19. The device of claim 18, wherein respectively synchronizing for each of the plurality of fragments causes the temporary framework reflecting the supplier model to be incrementally created as each of the plurality of fragments is synchronized; and
- wherein the temporary framework is stored in memory of the device.

20. The device of claim 19, wherein each of the plurality of fragments is replaced with a respective copy from the temporary framework reflecting the supplier model.

21. The device of claim 18, traversing the client model from the top downward to the foreign element, wherein the traversing of the client model corresponds to the elements marked as to be traversed in the temporary framework; and
- resolving the foreign element based on the value for the foreign element found when traversing the client model, wherein for the value for foreign element found when traversing the client model, add the value for the foreign element in the placeholder in the temporary framework.

22. The device of claim 21, further comprising if the client model is unloaded or if when traversing the client model an unloaded element is reached, determining another client model; and
- traversing the other client model from the top downward to the foreign element, wherein the traversing of the other client model corresponds to the elements marked as to be traversed in the temporary framework;
- resolving the foreign element based on the value for the foreign element found when traversing the other client model, wherein for the value for the foreign element found when traversing the other client model, add the value for the foreign element in the placeholder in the temporary framework.

23. The device of claim 22, further comprising when traversing has been attempted for all the client models to resolve the foreign element and it is determined that all the client models are unloaded, determining a least costly client model of all the client models to load;
- wherein determining the least costly client model comprises determining a memory footprint for each of all the client models based on a memory requirement for loading nodes to reach the foreign element;
- loading the least costly client model from memory;
- traversing the least costly model from the top downward to the foreign element; and
- resolving the foreign element based on the value for the foreign element found when traversing the least costly client model, wherein for the value for the foreign element found when traversing the least costly client model, add the value for the foreign element in the placeholder in the temporary framework.

24. A computer program product, tangibly embodied on a non-transitory computer readable medium, the computer program product including instructions for causing a computer to execute a method for annotating and synchronizing, comprising:
- marking a client root model of a plurality of fragments with annotations in response to triggers received, wherein marking the client root model of the plurality of fragments with annotations comprises:
  - in response to any of the plurality of fragments being extracted out and flagged, marking the client root model with annotations;

in response to binding any of the plurality fragments to a source, marking the client root model of the plurality of fragments with annotations and marking the client root model as flagged; and in response to sharing in any of the plurality of fragments, marking the client root model with annotations and marking the client root model as flagged;

in response to a request to synchronize the plurality of fragments being shared by a sharing client model, finding annotations in the client root model of the plurality of fragments referring to a supplier model; and synchronizing 1-J of the plurality of fragments, wherein J is a last of the plurality of fragments being synchronized, wherein synchronizing occurs for each of the plurality of fragments and synchronizing for each of the plurality of fragments comprises:

scanning the supplier model to match a supplier file to a processing fragment of the plurality of fragments, wherein when the supplier file is matched in the supplier model, the scanning stops;

for the supplier file, creating an ancestor containment hierarchy, wherein the ancestor containment hierarchy starts with the supplier file and ends at a supplier primary root of the supplier model;

creating a copy of the supplier file in a temporary framework reflecting the supplier model; and if it determined that there is reference to a foreign element in the supplier file, resolving the foreign element when synchronizing at least one of a previous processing fragment and subsequent processing fragment, wherein a containment hierarchy of the foreign element is added in the temporary framework.

* * * * *